US006789412B2

(12) United States Patent
Mototani et al.

(10) Patent No.: US 6,789,412 B2
(45) Date of Patent: Sep. 14, 2004

(54) OIL PRESSURE SIGNAL OUTPUT DEVICE

(75) Inventors: Masayoshi Mototani, Oyama (JP); Shuuji Hori, Oyama (JP)

(73) Assignee: Komatsu Ltd., Tokyo (JP)

( * ) Notice: Subject to any disclaimer, the term of this patent is extended or adjusted under 35 U.S.C. 154(b) by 64 days.

(21) Appl. No.: 10/278,860

(22) Filed: Oct. 24, 2002

(65) Prior Publication Data

US 2003/0079532 A1 May 1, 2003

(51) Int. Cl.[7] ................................................ G01M 15/00
(52) U.S. Cl. ........................................................ 73/116
(58) Field of Search ........................... 91/459; 73/118.2, 73/49.7, 40, 46, 47; 251/30, 30.02; 123/477, 90.11; 477/138, 143; 241/34; 60/450

(56) References Cited

FOREIGN PATENT DOCUMENTS

JP 10204929 8/1998
JP 2000-147407 A 5/2002

*Primary Examiner*—Edward Lefkowitz
*Assistant Examiner*—Octavia Davis
(74) *Attorney, Agent, or Firm*—Varndell & Varndell, PLLC

(57) ABSTRACT

An oil pressure signal output device which is easy to be integrated with an additional EPC valve and can be manipulated inside/outside a driver's cab. The device makes it possible to reduce the occupied area of hydraulic apparatuses in the driver's cab and to extend a space other than that of hydraulic apparatuses. In the device: the manual oil pressure signal output device for controlling a first hydraulic apparatus, the first electric oil pressure signal output device and the selecting output means are integrated; a second electric oil pressure signal output device for controlling a second hydraulic apparatus abuts against the first electric oil pressure signal output device is removably provided.

8 Claims, 22 Drawing Sheets

OIL PRESSURE SIGNAL OUTPUT DEVICE

BACKGROUND OF THE INVENTION

1. Field of the Invention

The present invention relates to an oil pressure signal output device and more particularly to an oil pressure signal output device responsive to signals produced by manual operations inside a vehicle or by external operations including radio control or others from outside the vehicle to output oil pressure signals according to the operations to a hydraulic apparatus.

2. Discription of the Related Art

The driver's cab of working vehicles including a hydraulic excavator is equipped with an oil pressure signal output device for outputting a pilot pressure oil according to the operations of an operation lever or others. As for this oil pressure signal output device, an operator sways an operation lever back and forth, rightward and leftward, or obliquely to manipulate it manually, thereby manipulating pressure reducing valves through the respective pistons. Then, the pressure reducing valves output oil pressure signals of pilot pressure oil to hydraulic apparatuses according to a quantity of the operation. The actuation of the hydraulic apparatuses controls the operations of a vehicle or working machine.

Now, FIG. 25 is a sectional view of a manual oil pressure signal output device having an operation lever. In the manual oil pressure signal output device 50 (hereinafter referred to as PPC valve 50), the single operation lever 7 is swayed back and forth, or rightward and leftward, whereby four pressure reducing valves 14 corresponding to four pistons 4, 6 respectively (the pistons 3, 5 are not shown) output oil pressure signals according to the displacement of the pistons, more specifically pilot pressure oil, toward operating valves (not shown), which is a hydraulic apparatus, to switch the operating valves. Controlling the operating valves controls the operation of a hydraulic motor for driving a vehicle, a hydraulic cylinder for actuating a working machine, or the like.

An electric oil pressure signal output device for outputting pilot pressure oil in response to electric signals may be provided. This electric oil pressure signal output device is used in a case where an operator manipulates a remote operation device at a place away from a vehicle, such as the case of working at a disaster-stricken district, to activate a working vehicle. Based on the control commands sent from the remote operation device by radio, the controller outputs a control command current to the electric oil pressure signal output device and the electric oil pressure signal output device outputs pilot pressure oil with a pressure according to an amount of this command current.

FIG. 26 is a sectional view showing the electric oil pressure signal output device. Individual electric oil pressure signal output devices 60 are provided corresponding to the four pressure reducing valves 14 of the PPC valve 50 respectively. When the electric oil pressure signal output devices 60 are manipulated remotely, the operation of a hydraulic motor for driving use, a hydraulic cylinder for working machines, or the like can be controlled. Each electric oil pressure signal output device 60 has a electromagnetic, pressure-proportional pressure reducing valve 27, which is actuated by a solenoid, and it is hereinafter referred to as EPC valve 60. In the EPC valve 60, the thrust proportional to an amount of command current flowing through the solenoid coil 25 acts on the plunger 26 in the direction of U to actuate the spool 28, thereby outputting pilot pressure oil with a pressure according to the command current.

While FIGS. 25 and 26 use the same reference numerals for constituent elements as those of the elements in the description of the embodiments of the invention, their description are omitted here.

As shown in FIG. 27, inside driver's cab of a vehicle, there are provided a PPC valve 50 and an EPC valve 60 separately, and further separately provided a shuttle valve 30 connected to the PPC valve 50 and EPC valve 60. The shuttle valve 30 outputs pilot pressure oil from one of the PPC valve 50 and EPC valve 60, which is under higher pressure than the other. This pilot pressure oil is input an operating valve for controlling pressure oil to be supplied to a hydraulic motor or a working machine. Therefore, when an operator manipulates an operation lever or a remote operation device, the operating valve is switched by the pilot pressure oil, thereby enabling a vehicle to run or a working machine to be actuated.

However, in the above conventional construction, when a PPC valve 50, EPC valve 60 and shuttle valve 30 are provided as separate units inside driver's cab of a vehicle, it is required to connect the PPC valve 50, EPC valve 60 and shuttle valve 30 through piping including a hose, and thus a large occupied area is needed. This causes the problem that the remaining space except these hydraulic apparatuses in a driver's cab becomes relatively small, which makes it difficult to place other vehicle-mounted apparatuses.

The invention was made in consideration of these actual conditions, so it is a first challenge of the invention to provide an oil pressure signal output device using a small occupied area, thereby reducing an occupied area of hydraulic apparatuses in a driver's cab to make a space except hydraulic apparatuses larger.

As a solution thereof, we have offered suggestions, Japanese patent application No. 2000-340612 and 2000-346711 (JP-A-2002-147407).

In the meantime, in recent years, it has become common practice for working vehicles including a hydraulic excavator to be mounted with various attachments including a clamshell bucket or a breaker in addition to a working machine, such as a regular excavator and thus the contents of works have spread. For this reason, an operating valve for controlling a hydraulic apparatus for an attachment use is additionally required, and it is necessary to provide a PPC valve 50 and EPC valve 60 for the purpose of switching this operating valve, and either the set of an electric switch and EPC valve 60, or the set of an electric lever and EPC valve 60 inside the driver's cab to enable an operator to conduct manual operations inside the driver's cab and to perform the manipulations by a remote operation device outside the cab. Incident to this, however, the addition of the EPC valve 60 inside the driver's cab leads to the needs for connecting additional piping with this EPC valve 60, whereby the occupied area of the hydraulic apparatus becomes larger. On this account, providing a new EPC valve 60 for the attachment use inside the driver's cab causes an additional problem that a space except the hydraulic apparatus relatively becomes smaller.

Further, there may be a case where an attachment is additionally mounted after shipment. Also, in this case, it is strongly desired to provide an oil pressure signal output device which can be easily mounted with an attachment and can be manipulated readily.

SUMMARY OF THE INVENTION

The invention was made focusing on the problem and relates to an oil pressure signal output device. Therefore, it is an object to provide an oil pressure signal output device, which permits easy integration of a new EPC valve for an attachment use and manipulation from inside and outside a driver's cab, and which is capable of making the occupied area of hydraulic apparatuses smaller and a space except the hydraulic apparatuses larger.

To attain the above objects, an oil pressure signal output device according to a first embodiment of the invention includes: a manual oil pressure signal output device for outputting an oil pressure signal based on a manual operation; at least one first electric oil pressure signal output device for outputting an oil pressure signal based on an electric signal; and selecting output means for selecting either an oil pressure signal output from said manual oil pressure signal output device or an oil pressure signal output from said first electric oil pressure signal output device to output the selected oil pressure signal outside, wherein the manual oil pressure signal output device for controlling a first hydraulic apparatus, the first electric oil pressure signal output device and the selecting output means are integrated, a second electric oil pressure signal output device for controlling a second hydraulic apparatus different from the first hydraulic apparatus is removably provided and abutting against the first electric oil pressure signal output device.

According to the first embodiment, in the oil pressure signal output device, the manual oil pressure signal output device for controlling a first hydraulic apparatus (PPC valve), the first electric oil pressure signal output device (EPC valve) and selecting output means (hereinafter referred to as shuttle valves) are integrated; a second EPC valve for controlling a second hydraulic apparatus different from the first hydraulic apparatus abuts against the first EPC valve and is removably provided. For this reason, the second EPC valve for the other hydraulic apparatus can be mounted easily and compactly even when an additional (second) hydraulic apparatus for a new attachment is required at the time of or after the shipment. Further, even when an additional second EPC valve is provided, it is not required to connect it through piping including a hose, so that the occupied area of hydraulic apparatuses in a driver's cab can be reduced. Therefore, it is possible to secure a larger space other than that of hydraulic apparatuses in a driver's cab.

An oil pressure signal output device according to a second embodiment of the invention includes: a manual oil pressure signal output device for outputting an oil pressure signal based on a manual operation by an operator in a driver's cab; a first electric oil pressure signal output device for outputting an oil pressure signal based on an electric signal from outside the driver's cab; and selecting output means for selecting either an oil pressure signal output from the manual oil pressure signal output device or an oil pressure signal output from the first electric oil pressure signal output device to output the selected oil pressure signal outside, wherein the manual oil pressure signal output device for controlling a first hydraulic apparatus, the first electric oil pressure signal output device and the selecting output means are integrated, a pump passage for supplying pressure oil from a hydraulic pump, and a tank passage for draining return oil into a tank, which are respectively brought into communication with a side surface of the first electric oil pressure signal output device, a second electric oil pressure signal output device for controlling a second hydraulic apparatus different from the first hydraulic apparatus can be mounted additionally, and covers for blocking the pump passage and the tank passage are removably provided on side surfaces of the first electric oil pressure signal output device.

In the oil pressure signal output device according to the second embodiment, the PPC valve, the first EPC valve and the shuttle valves are integrated; the EPC valve for a second hydraulic apparatus can be additionally mounted on a side surface of the first EPC valve; and covers are removably provided, so that it is possible to obtain the same actions and advantages as those of the first embodiment and also to manipulate the second EPC valve using an electric lever, switch or the like from outside a driver's cab. This also enables an additional working machine such as an attachment to be manipulated from outside a driver's cab and enables the remote manipulation. Further, a new attachment can be mounted easily even after shipment, thereby improving the maintainability.

In a third and fourth embodiments, in addition to the conditions of the first and second embodiments, a bottom surface of the manual oil pressure signal output device and an upper surface of the first electric oil pressure signal output device abut against each other to be integrated, and the second electric oil pressure signal output device is removably provided on a side surface of the first electric oil pressure signal output device.

According to the third and fourth embodiments, a bottom surface of the PPC valve and an upper surface of the first EPC valve abut against each other to be integrated, and the second EPC valve is removably provided on a side surface of the first EPC valve, so that it is possible to install a given number of the second EPC valves on both side surfaces of the first EPC valve easily. Additionally, because the second EPC valve is mounted on the side surface of the first EPC valve, it is not subjected to the interference of the piping for the first EPC valve, so that the second EPC valve can be easily mounted and removed and therefore the maintainability can be improved.

In a fifth to eighth embodiments, in addition to the conditions of the first to fourth embodiments, the manual oil pressure signal output device, the first electric oil pressure signal output device, and the second electric oil pressure signal output device, which are mutually adjacent, are connected through pump passages and tank passages provided inside the respective oil pressure signal output devices and are connected to a common hydraulic pump and a common tank.

According to the fifth to eighth embodiments, the PPC valve, the first EPC valve, and the second EPC, which are mutually adjacent, are connected through pump passages and tank passages provided in their inside and are connected to a common hydraulic pump and a common tank. Therefore, it is not required to add neither pump line nor tank line when providing an EPC valve for manipulating a new attachment and it is possible to easily mount an oil pressure signal output device capable of manipulating a new attachment at the time of and after the shipment. Further, even when a new second EPC valve is provided, the connection through piping including a hose is not required, so that the occupied area of the hydraulic apparatuses in a driver's cab can be reduced. In addition, the need for adding a pump line and a tank line is eliminated, and it become possible to reduce the number of assembly steps and to improve the maintainability.

DESCRIPTION OF THE PREFERRED EMBODIMENTS

Figure 1:
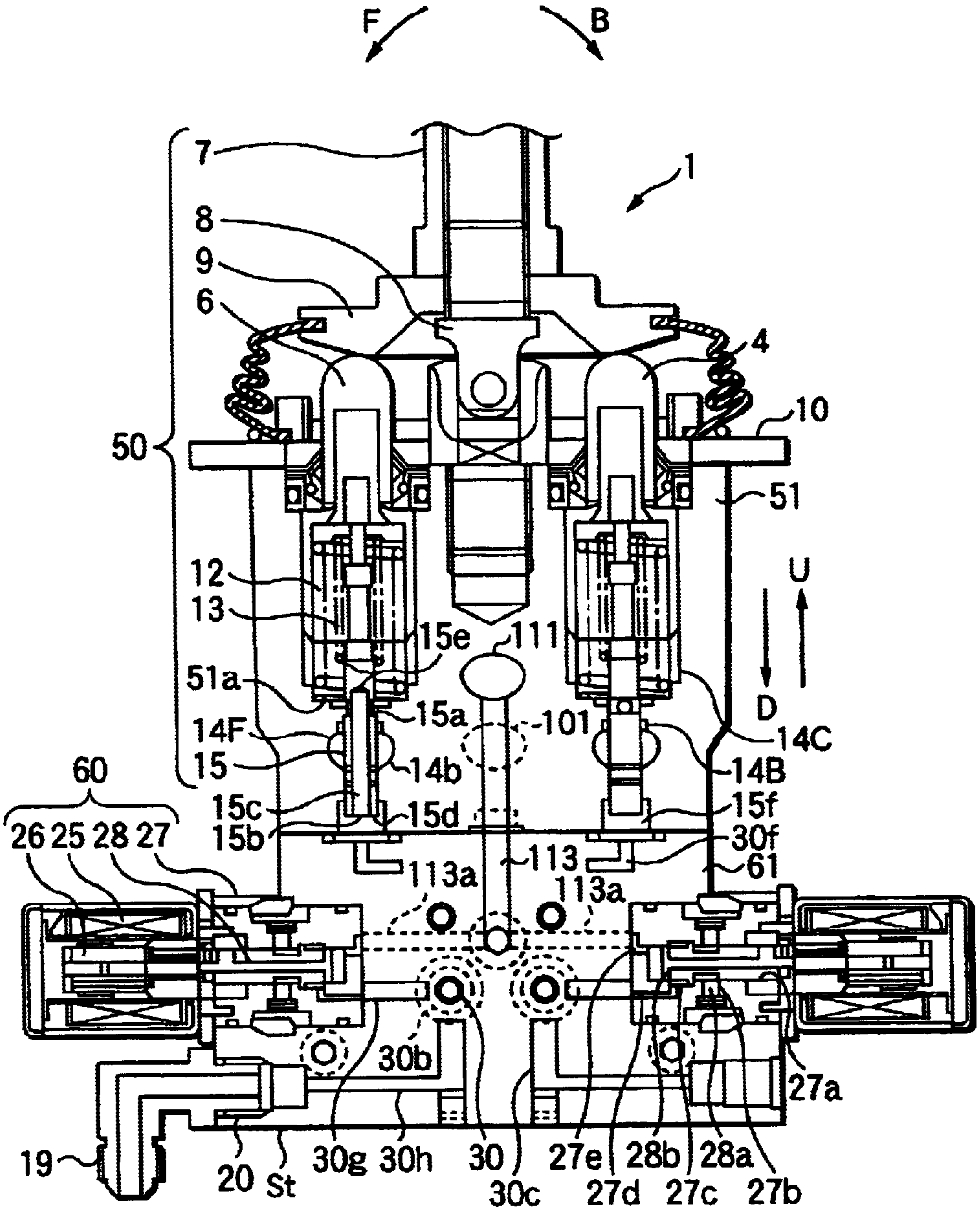
FIG. 1 is a side sectional view of an oil pressure signal output device of the first embodiment.

The embodiments of an oil pressure signal output device according to the invention are hereinafter described in reference to the drawings Incidentally, the same constituent elements as the elements in the drawings used in the related art description are described below with the same reference numerals.

Figure 2:
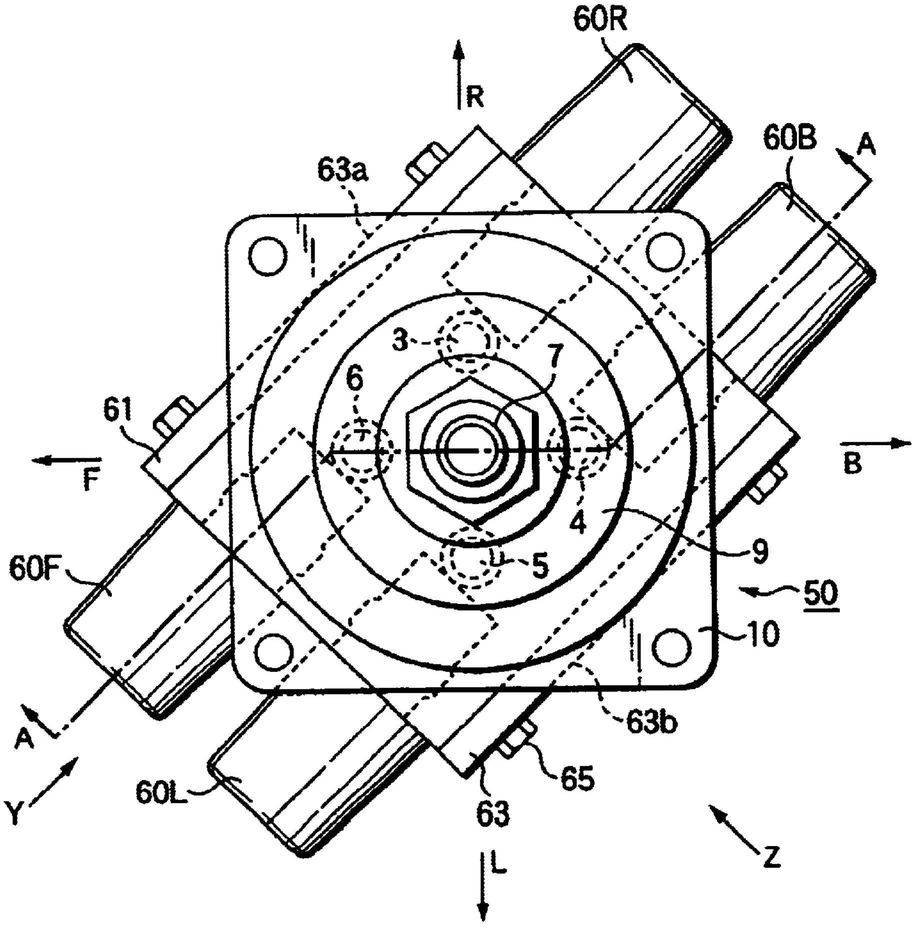
FIG. 2 is a top plan outline view of FIG. 1.
Figure 3:
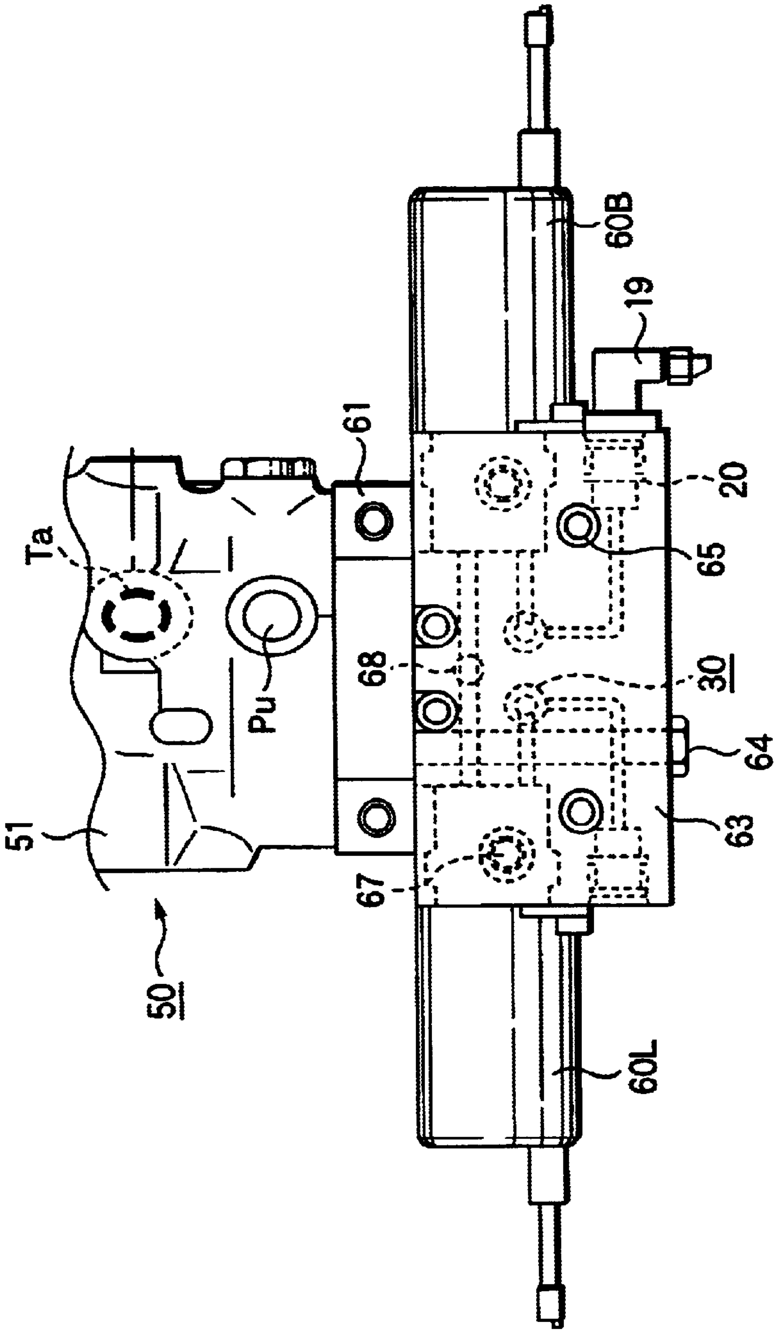
FIG. 3 is a side view taken from a direction indicated by the arrow Z of FIG. 2.
Figure 4:
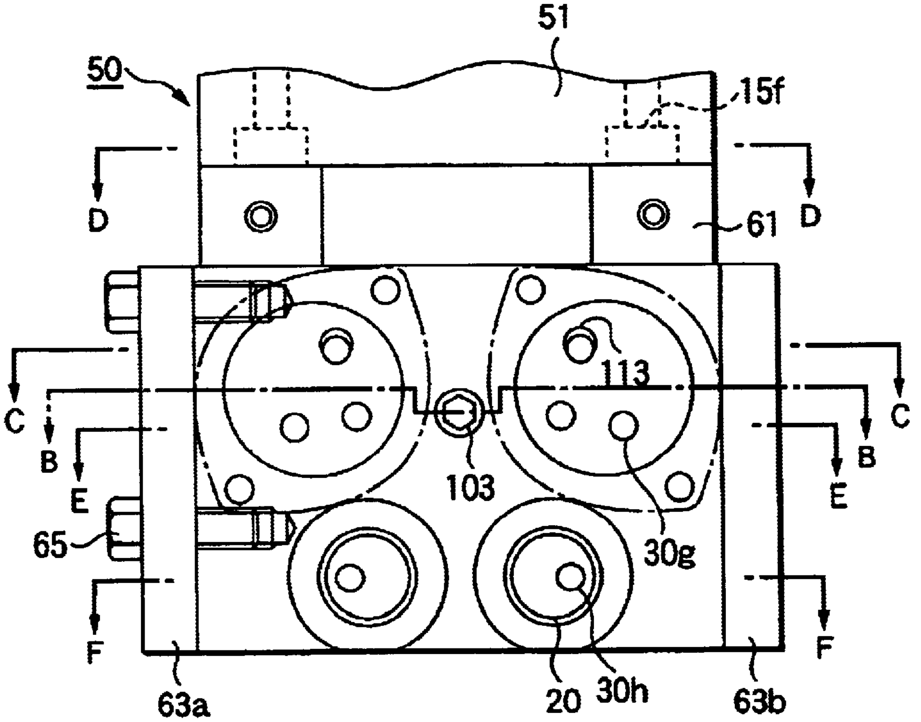
FIG. 4 is a side view taken from a direction indicated by the arrow Y of FIG. 2.
Figure 5:
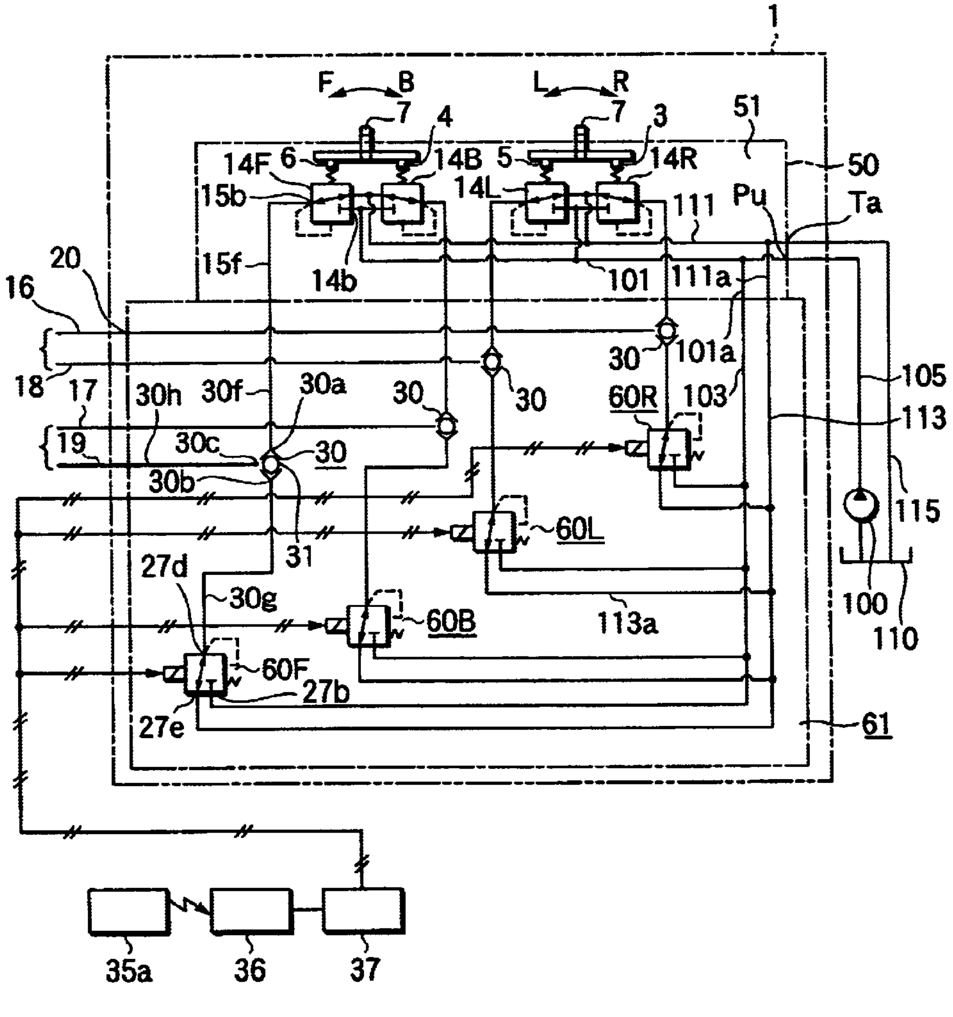
FIG. 5 is a hydraulic circuit diagram of the first embodiment.
Figure 24A:
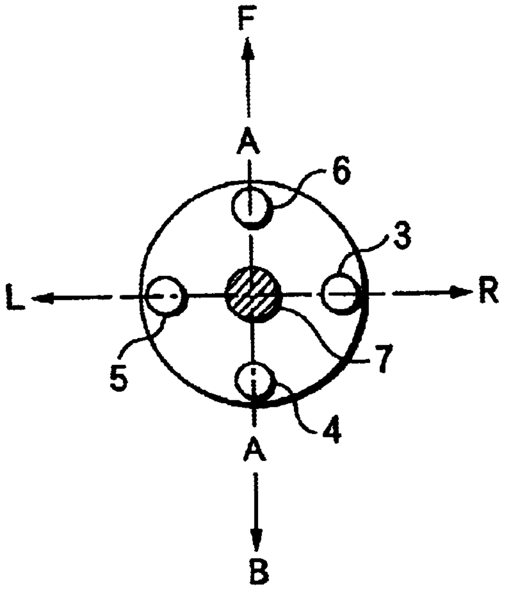
FIGS. 24A and 24B are illustrations of a two-axis PPC valve used in the invention.
Figure 24B:
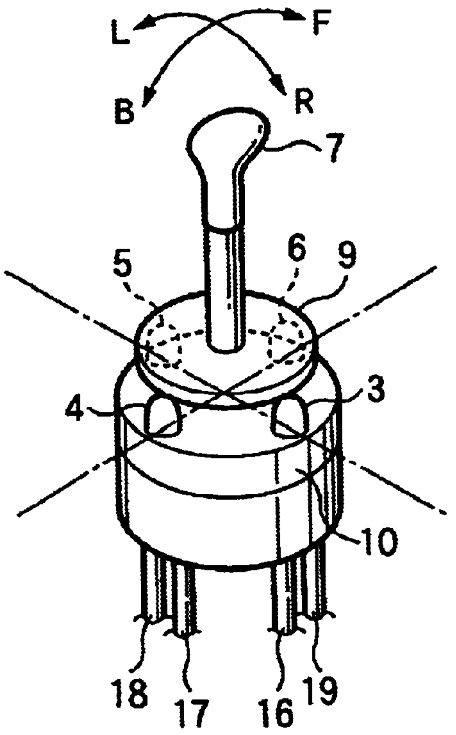
Figure 25:
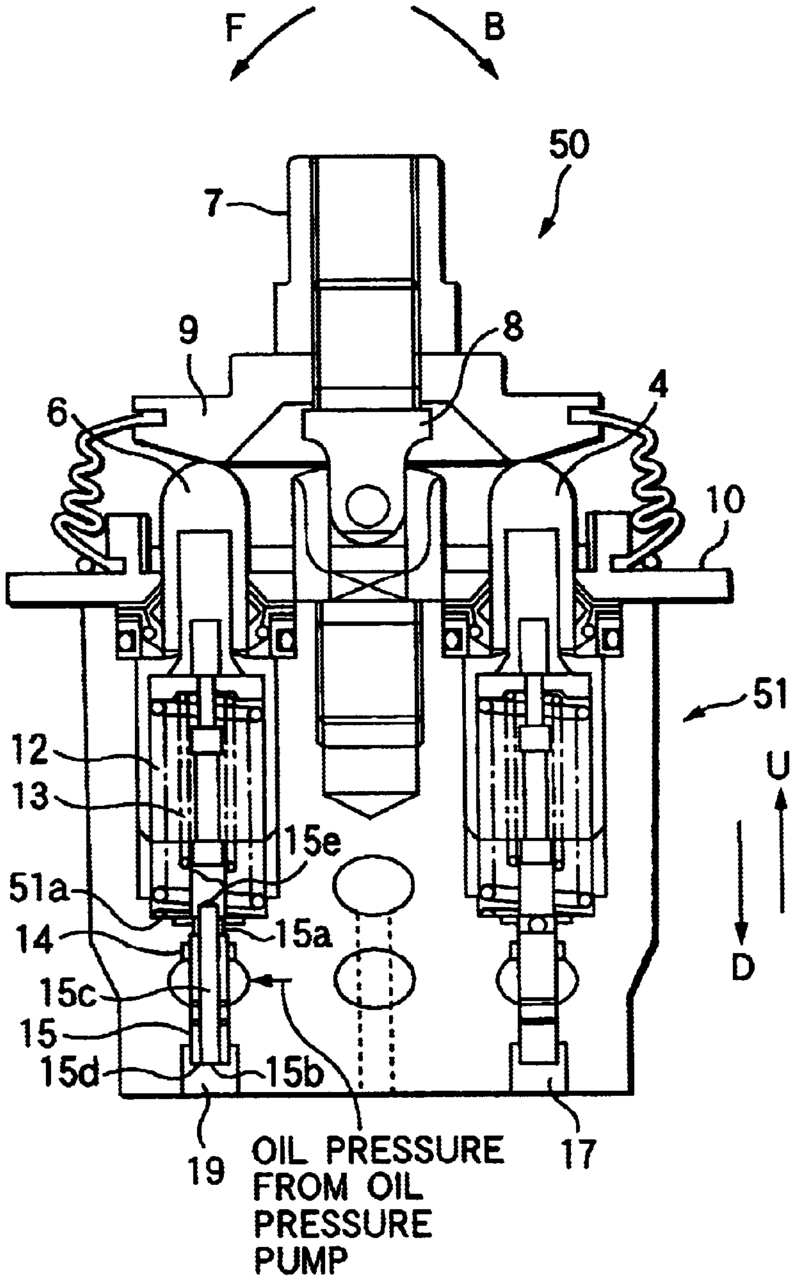
FIG. 25 is a sectional view of a conventional PPC valve.
Figure 26:
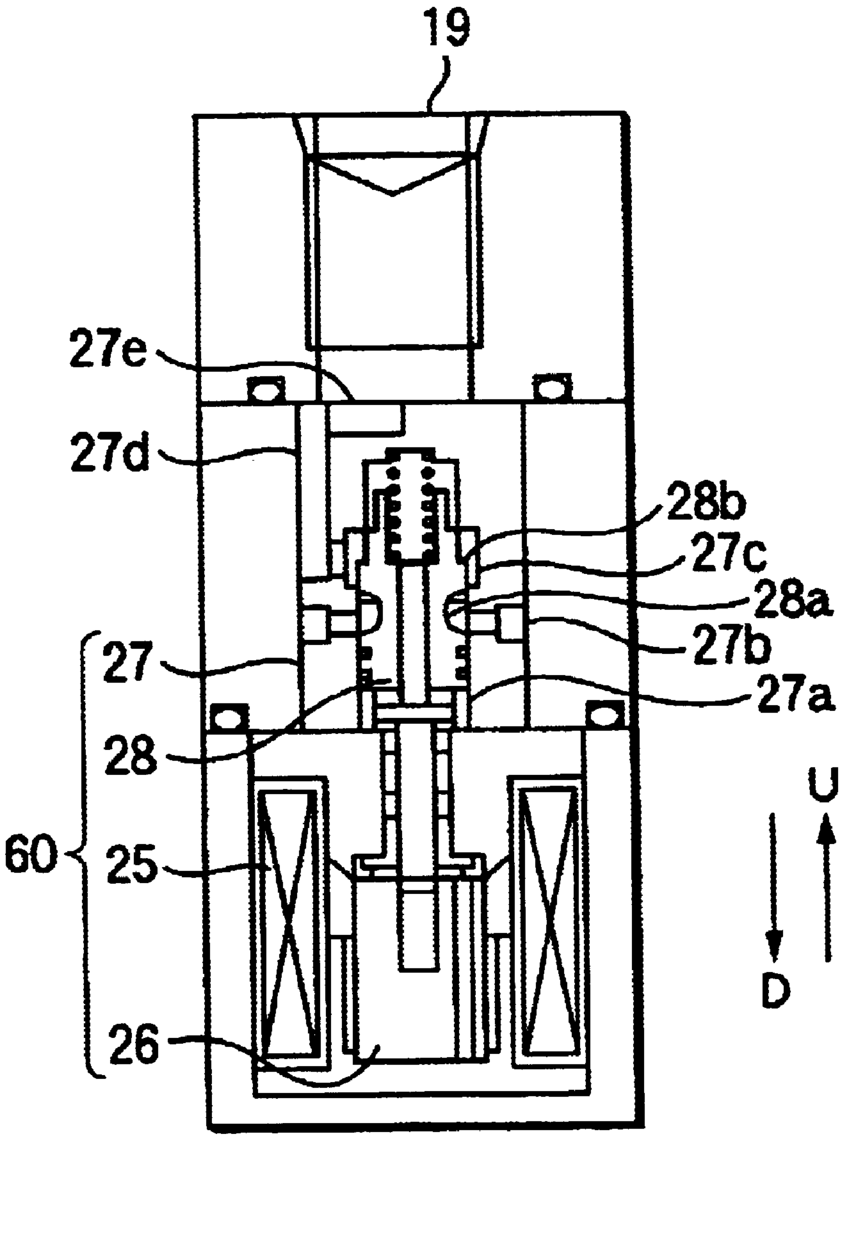
FIG. 26 is a sectional view of a conventional EPC valve.
Figure 27:
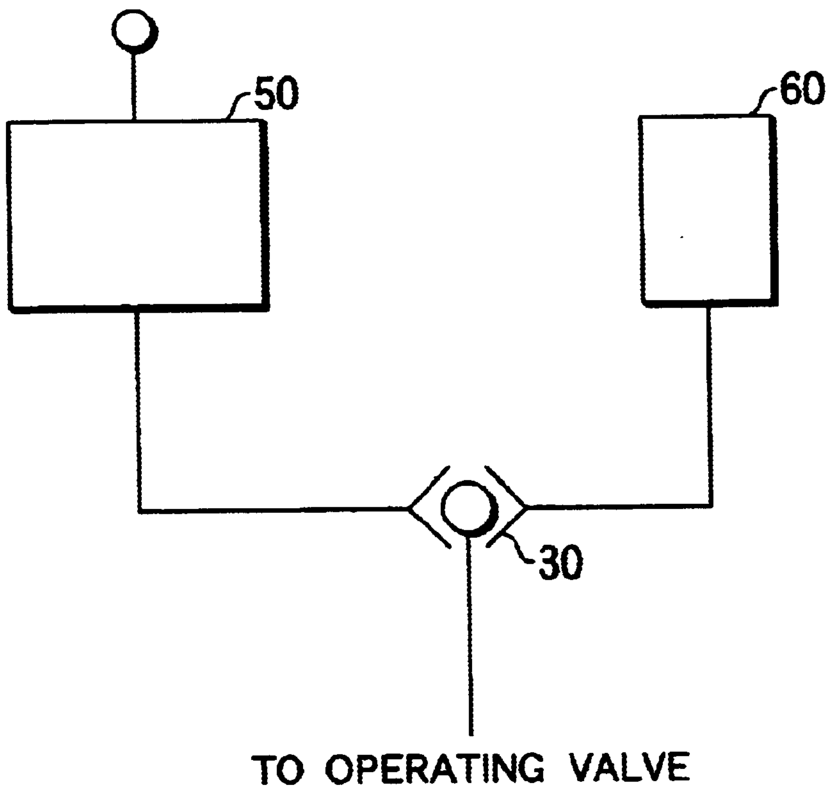
FIG. 27 is a hydraulic circuit diagram showing the relationships among the PPC valve, EPC valve, and the shuttle valve.

First, referring to FIGS. 1 to 5, an oil pressure signal output device 1 of a first embodiment is described. FIG. 1 is a side sectional view of the oil pressure signal output device 1 (a sectional view taken along the line A—A of FIG. 2); FIG. 2 is a top plan outline view of FIG. 1; FIG. 3 is a partial side outline view of FIG. 1 (a side view taken from a direction indicated by the arrow Z of FIG. 2); FIG. 4 is a partial front outline view of FIG. 1 (a side view taken from a direction indicated by the arrow Y of FIG. 2); and FIG. 5 is a hydraulic circuit diagram of the oil pressure signal output device 1 of the first embodiment. Additionally, FIGS. 24A and 24B are drawings for showing the move of an operation lever 7 in a PPC valve with 2-axis operation directions. The embodiment is described with reference to the move of this operation lever 7.

As shown in FIGS. 1, 3 and 5, an oil pressure signal output device 1 according to the invention mainly includes: a PPC valve 50; at least one EPC valve 60 (e.g. four EPC valves here); and at least one shuttle valve 30 (e.g. four shuttle valves here). The upper surface of each of the EPC valves 60 abuts against the bottom surface of the PPC valve 50. Both the valves 50, 60 are coupled through bolts to be integrated. Between the PPC valve 50 and EPC valve 60, which have been integrated, is interposed a shuttle valve 30 provided in an EPC valve body 61 having the EPC valve 60 mounted thereon.

In FIGS. 1, 2 and 3, the bottom surface of the body 51 of the PPC valve 50 abuts against the upper surface of the EPC valve body 61 and they are coupled by bolts for valve body use 64 (See FIG. 3), while on the opposite side surfaces of the EPC valve body 61 are installed EPC valves 60 (60F, 60B, 60R, 60L in this drawing) corresponding to respective PPC-valve pressure reducing valves 14 (14F, 14B, 14R, 14L in this drawing) of the PPC valve 50.

On the side surfaces of the EPC valve body 61 other than the faces with which the EPC valves 60 installed, covers 63 are removably mounted by cover bolts 65 (See FIG. 2) to be integrated therewith. In association with this practice, the EPC valve body 61 is formed so that between the side surface of the EPC valve body 61 and each of the covers 63 can be added a given number of other EPC valves 60A for actuating other hydraulic apparatuses as many as they are required, as described later. In the description below, the covers 63 on both the side surfaces are referred to as right-side cover 63*b* and left-side cover 63*a*, if required.

As shown in FIGS. 3 and 5, the body 51 of the PPC valve 50 is provided with a pump port Pu for connecting to a hydraulic pump 100 and a tank port Ta for connecting to a tank 110. The pump port Pu communicates with an inside-PPC-valve pump passage 101 formed in the body 51 of the PPC valve 50 and with an inside-EPC-valve pump passage 103 formed in the EPC valve body 61 through the inside-PPC-valve pump passage 101. The inside-PPC-valve pump passage 101 branches out into the inside-PPC-valve pump passage 101 and a passage 101*a* connecting to the inside-EPC-valve pump passage 103 inside the body 51. Therefore, the PPC valve 50 and the EPC valves 60 are connected to a common hydraulic pump 100 in parallel.

The tank port Ta communicates with an inside-PPC-valve tank passage 111 formed in the body 51 of the PPC valve 50 and an inside-EPC-valve tank passage 113 formed in the EPC valve body 61 through this inside-PPC-valve tank passage 111. The inside-PPC-valve tank passage 111 branches out into the inside-PPC-valve tank passage 111 and a passage 111*a* connecting to the inside-EPC-valve tank passage 113 inside the body 51.

Therefore, the return oils from the PPC valve 50 and from the EPC valve 60 are returned to a common tank 110, respectively, through the inside-PPC-valve tank passage 111 and the tank port Ta and through the inside-EPC-valve tank passage 113, inside-PPC-valve tank passage 111 and tank port Ta.

Figure 6:
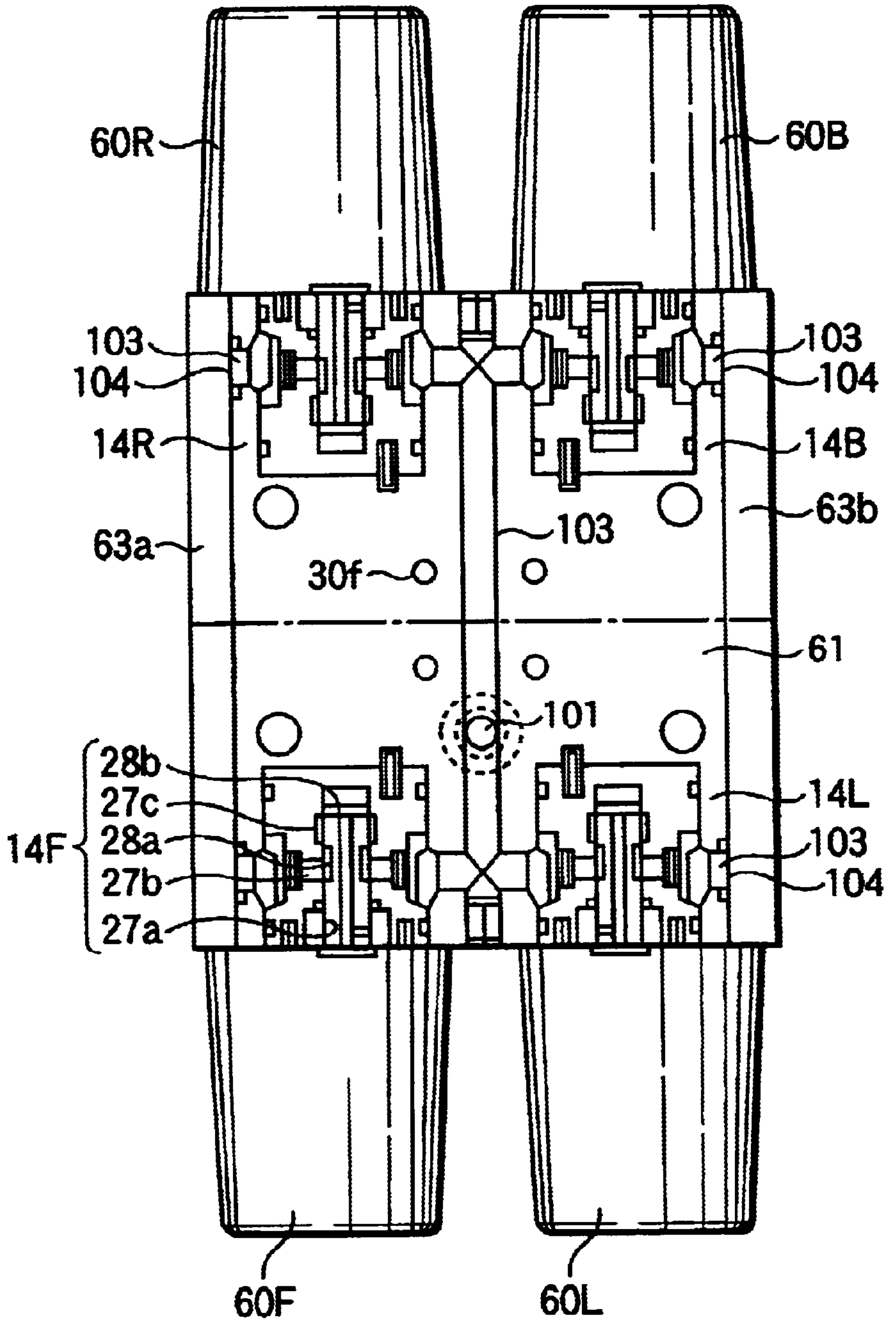
FIG. 6 is a sectional view taken along the line B—B of FIG. 4.
Figure 7:
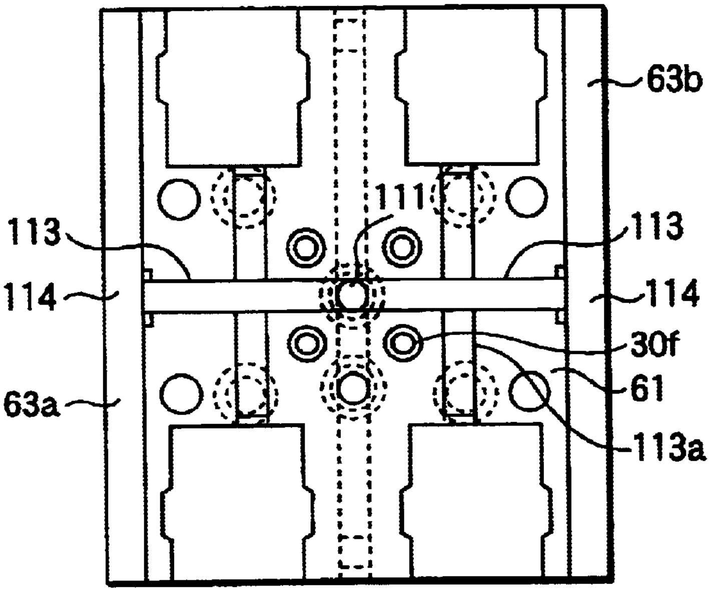
FIG. 7 is a sectional view taken along the line C—C of FIG. 4.

Referring now to FIGS. 6 and 7. FIG. 6 is a sectional view taken along the line B—B of FIG. 4. FIG. 7 is a sectional view taken along the line C—C of FIG. 4 and represents the structure inside the EPC valve 60 for brevity. As shown in FIGS. 6 and 7, the inside-EPC-valve pump passage 103 and inside-EPC-valve tank passage 113, which connect each of the EPC valves 60 to the hydraulic pump 100 and tank 110 respectively, are blocked at both the end surfaces of the EPC valve body 61 by the covers 63 (the left-side cover 63*a* and right-side cover 63*b* in the drawings).

Therefore, a length of pump line 105 and a length of tank line 115 shown in FIG. 5 can suffice for the lines for connecting between the hydraulic pump 100 and the pump port Pu and between the tank port Ta and the tank 110 respectively, so that it is possible to decrease the number of parts and the number of process steps for connecting the lines and to reduce the occupied area.

Referring to FIGS. 1 and 5 again, wherein the EPC valve body 61 houses the shuttle valves 30 interposed between the PPC valve 50 and the respective EPC valves 60. The shuttle valve 30 is an example of selecting output means that selectively outputs one of two types of oil pressure signals. The shuttle valve compares the pilot pressure oil of the PPC valve 50 with that of the EPC valve 60 in pressure to output the higher one as a pilot pressure. In other words, the shuttle valve 30 outputs the pilot pressure oil of the PPC valve 50 when the PPC valve 50 is manipulated and it outputs the pilot pressure oil of the EPC valve 60 when the EPC valve 60 is controlled.

The pressure of pilot pressure oil output from each of the shuttle valve 30 is output from the pilot discharge opening 20 provided in proper alignment with the EPC valve 60 on the side surface of the EPC valve body 61 through a pilot line 19 to each operating valve that is not shown. Incidentally, this pilot discharge opening 20 may be provided on the bottom surface St of the EPC valve body 61.

Now, the PPC valve 50 is described in detail.

Referring to FIGS. 1, 2, 5, 24A, and 24B, wherein the PPC valve 50 mainly includes: a body 51; an operation lever 7 provided swayably in two directions, namely back and forth FB, and rightward and leftward LR, with respect to the body 51; a disc plate 9 provided on a lower portion of the operation lever 7; four pistons 3–6 each provided movably up and down under the disc plate 9 in the body 51 on the back, forth, right or left sides of the operation lever 7, the pistons 3–6 each capable of moving up and down through the disc plate 9 by swaying the operation lever 7; and PPC-valve pressure reducing valves 14 for outputting pilot pressure oil in response to a quantity of swaying of the operation lever 7 through up-and-down movements of the pistons 3–6.

For example, in a case where the PPC valve 50, EPC valve 60 and pressure reducing valve 14 and others are distinguished as needs come up, the description will be done below while indicating these elements with the foregoing reference numerals followed by the letters of F, B, L and R, which correspond to the symbols used in FIGS. 24A and 24B for indicating the operation directions of the operation lever 7, namely forward F, backward B, leftward L and rightward R. For instance, the PPC valve 50 for forward manipulation is indicated by the reference numeral of 50F, and the PPC-valve pressure reducing valve 14 for forward manipulation is indicated by 14F.

The operation lever 7 is mounted to the body 51 through the free joint 8 and disc plate 9 so that it can be freely swayed leftward/rightward, F, B on the sheet of FIG. 1 and in two directions orthogonal to this sheet, L, R. The disc plate 9 is mounted to the operation lever 7 so that it abuts against the tops (upper ends) of the pistons 3, 4, 5 and 6 at the bottom surface thereof.

As shown in FIG. 1, the four pistons 3, 4, 5 and 6 are provided so that the tops (upper ends) of the pistons protrude upward from the mounting plate 10 for mounting the oil pressure signal output device 1. The pistons 3, 4, 5 and 6 are provided respectively at locations corresponding to the four operation directions of the operation lever 7, as shown in FIG. 2. For example, when the operation lever 7 is swayed in the F direction, the disc plate 9 pushes the piston 6 down by a stroke corresponding to the swaying quantity and therefore pilot pressure oil with a pressure corresponding to the stroke of the piston 6 is output from the PPC-valve pressure reducing valve 14F. Additionally, when the operation lever 7 is swayed in the B direction, the disc plate 9 pushes the piston 4 down and thus pilot pressure oil with a pressure corresponding to the stroke of the piston 4 is output from the PPC-valve pressure reducing valve 14B.

Similarly, swaying the operation lever 7 in the R or L direction causes the disc plate 9 to push the piston 3 or piston 5, respectively, down corresponding to the swaying quantity, so that pilot pressure oil having a pressure corresponding to the stroke of the piston 3 or 5 is output from the PPC-valve pressure reducing valve 14R or 14L, respectively.

Figure 8:
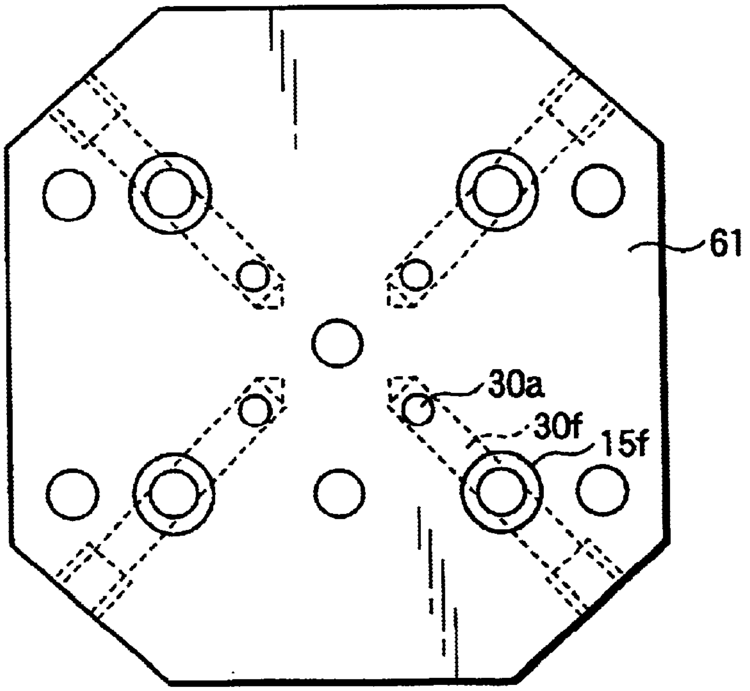
FIG. 8 is a sectional view taken along the line D—D of FIG. 4.

FIG. 8 shows a plan sectional view of the EPC valve and also it is a sectional view taken along the line D—D of FIG. 4. As shown in FIGS. 1 and 8, the pilot pressure oil output from each of the PPC-valve pressure reducing valves 14 is supplied to the PPC-valve pilot pressure oil input portion 30*a* of the shuttle valve 30 from a PPC-valve pressure oil output chamber 15*f* formed below the PPC-valve pressure reducing valve 14 through a pilot passage 30*f* formed in the upper portion of the EPC valve body 61.

The piston 6 is described as a representative below and the descriptions about the other pistons 3, 4 and 5 are omitted because they have the same contents.

As shown in FIG. 1, between the piston 6 and the spring seat 51*a* of the body 51 is provided with a first spring 12. Swaying the operation lever 7 in the F direction causes the piston 6 to be pushed down in a direction indicated by the arrow D against the urging force of the first spring 12. An operator can obtain given operating feelings due to the urging force of this first spring 12 when swaying the operation lever 7.

Referring to FIG. 5 again, wherein the body 51 is provided with the PPC-valve pressure reducing valves 14 for each producing pilot pressure oil having a pressure corresponding to a piston thrust for each of the pistons 3, 4, 5 and 6. The PPC-valve pressure reducing valves 14 of the pistons 3, 4, 5 and 6 are each connected in parallel to the inside-PPC-valve pump passage 101 provided in the body 51 through the respective pressure oil input portions 14*b* to be described later.

The body 51 is also provided with the inside-PPC-valve tank passage 111. This PPC-valve tank passage 111 is individually connected in parallel to oil discharge portions 14*c* of the respective PPC-valve pressure reducing valves 14, which will be described later, and it brings return oils back to the tank 110. Also, the inside-PPC-valve tank passage 111 is connected with the inside-EPC-valve tank passages 113 through branch passages 111*a* and the return oil of the EPC valve 60 is brought back to the tank 110 through the body 51.

Figure 9:
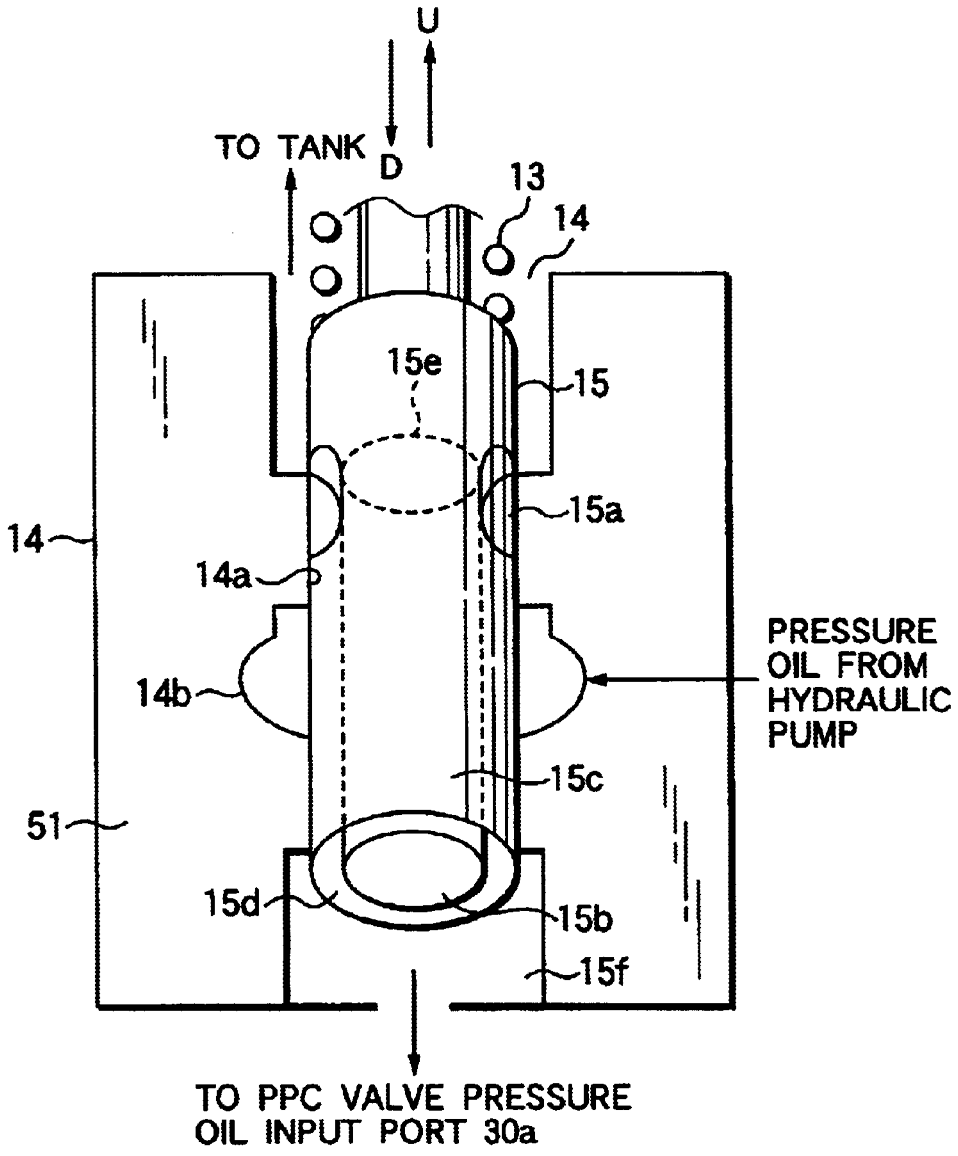
FIG. 9 is a schematic illustration of a pressure reducing valve for a PPC valve.

Referring now to FIG. 9, which shows the PPC-valve pressure reducing valve 14 schematically.

In FIG. 9, the PPC-valve pressure reducing valve 14 has a spool sliding bore 14*a* formed inside the body 51. In the spool sliding bore 14*a* is inserted a spool 15 pivotally, closely and slidably in a direction indicated by the arrow U or D. In the spool sliding bore 14*a* are also formed pressure oil input portions 14*b* for receiving pressure oil discharged from the hydraulic pump 100.

One end of the spool 15 is connected through a second spring 13 with the piston 6, and the spool 15 is arranged to receive a thrust according to an amount of the displacement of the piston 6 to slide within the spool sliding bore 14*a*. The body 51, which shrouds a sliding surface on one end of the spool 15, is also provided with an oil discharge portion 14*c*. The spool 15 has notch 15*a* formed in the sliding surface of one end thereof, while it has a pressure oil output portion 15*b* formed in the other end surface of the other end thereof.

Inside the spool 15, there is formed an inner line 15*c* communicating between the notch 15*a* and the pressure oil output portion 15*b*. The pressure oil output portion 15*b* communicates from the PPC-valve pressure oil output chamber 15*f* through the PPC-valve pressure oil input portion 30*a* of the shuttle valve 30 to the pilot line 19. Further, in the spool 15, there are formed pressure receiving portions 15*d*, 15*e* for receiving a pressure of output pilot pressure oil.

Next, the EPC valve 60 is described in detail.

Referring to FIGS. 1 and 6 again, in which the EPC valve 60 is provided with a solenoid coil 25, a plunger 26 which receives a thrust produced in response to a current conducted in the solenoid coil 25 to be displaced, and an EPC-valve pressure reducing valve 27 for producing pilot pressure oil having a pressure corresponding to a thrust of the plunger 26.

The plunger 26 is placed in a center axis portion of the cylindrical solenoid coil 25. Additionally, one end of the plunger 26 is connected to one end of the spool 28 of the EPC-valve pressure reducing valve 27.

This EPC-valve pressure reducing valve 27 is provided corresponding to each of the PPC-valve pressure reducing valves 14. That is, a given number of the EPC-valve pressure reducing valves 27, e.g. four EPC-valve pressure reducing valves here, are installed to the side surface of the EPC valve body 61. As shown in FIG. 6, the EPC valve body 61 has an inside-EPC-valve pump passage 103 formed therein. The inside-EPC-valve pump passage 103 is connected to pressure oil input portions 27*b* of the EPC-valve pressure reducing valve 27 (which are described later in detail) in parallel. As described, the inside-EPC-valve pump passage 103 is connected to the inside-PPC-valve pump passage 101 formed in the body 51 of the PPC valve 50 and receives pressure oil of the hydraulic pump 100 through the body 51. Also, the inside-EPC-valve pump passage 103 communicates with a plurality of connecting ports 104 provided in left-side and right-side end surfaces of the EPC valve body 61 and the connecting ports 104 are shut off with the left and right covers 63*a*, 63*b*.

As shown in FIG. 7, inside-EPC-valve tank passages 113, 113*a* are formed in the EPC valve body 61. The inside-EPC-valve tank passages 113, 113*a* are connected to oil discharge portions 27*e* of the EPC-valve pressure reducing valves 27 (See FIGS. 1 and 10) in parallel. As described above, the inside-EPC-valve tank passages 113, 113*a* are connected to the inside-PPC-valve tank passage 111 formed in the body 51 of the PPC valve 50 to bring return oil back to the tank 110 through the body 51. The inside-EPC-valve tank passages 113*a* each have one end portion connected to the oil discharge portion 27*e* and the other end portion connected to the inside-EPC-valve tank passage 113. The inside-EPC-valve tank passage 113 communicates with connecting ports 114 provided in left-side and right-side end surfaces of the EPC valve body 61, and the connecting ports 114 are shut off by the right and left covers 63*a*, 63*b*.

Figure 10:
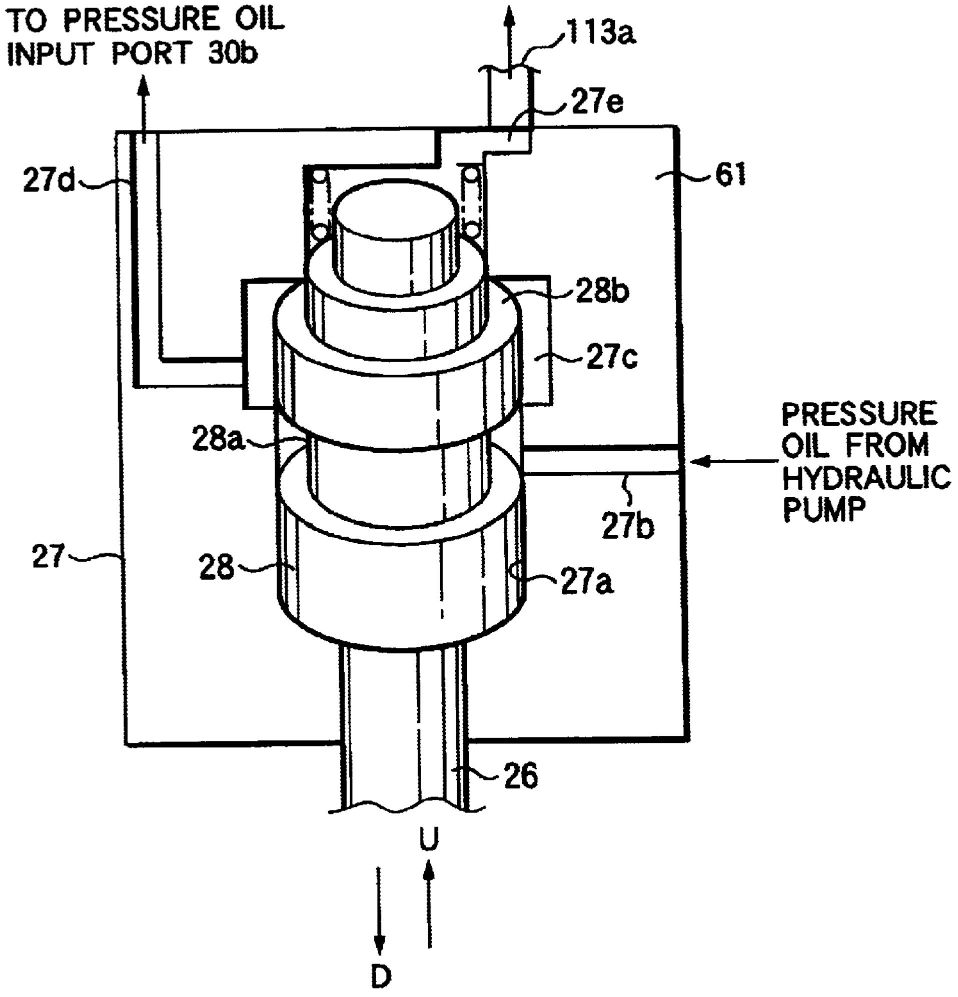
FIG. 10 is a schematic illustration of a pressure reducing valve for an EPC valve.

Referring to FIG. 10, which shows the EPC-valve pressure reducing valve 27 schematically.

In FIG. 10, the EPC-valve pressure reducing valve 27 has a spool sliding bore 27*a* formed in the EPC valve body 61. In the spool sliding bore 27*a* is inserted a spool 28 pivotally, closely and slidably in a direction indicated by the arrow U or D. In the spool sliding bore 27*a* are formed a pressure oil input portion 27*b* for inputting pressure oil discharged from the hydraulic pump 100, and a gap 27*c* communicated with the pressure oil input portion 27*b* according to the displacement of the spool 28. The gap 27*c* communicates with the pilot line 19 through the pressure oil output portion 27*d*, the EPC-valve pressure oil input portion 3*ob* of the shuttle valve 30 and a shuttle-valve pressure oil output portion 30*c*.

The spool 28 has one end portion connected with the plunger 26. On the opposite side, the EPC valve body 61 shrouding the other end portion of the spool 28 is provided with an oil discharge portion 27*e*. The oil discharge portion 27*e* is connected to the inside-PPC-valve tank passage 111 of the PPC valve 50 through the inside-EPC-valve tank passages 113, 113*a*.

The spool 28 slides inside the spool sliding bore 27*a*with the displacement of the plunger 26. The spool 28 has a notch 28*a* formed in the sliding surface. Also, the spool 28 has an annular portion 28*b* in the sliding surface, which is located in the gap 27*c* and receives pilot pressure oil output from the gap 27*c* when the pressure oil input portion 27*b* and gap 27*c* communicate with each other through the notch 28*a*.

In a case where a displacement of the spool 28 in a direction indicated by the arrow U is less than a given amount, or where a current flowing through the solenoid coil 25 is less than a given amount, the pressure oil input portion 27*b* does not communicate with the gap 27*c* and the pressure oil input portion 27*b* leads back to the tank 110 through a relief valve (not shown). In this case, the gap 27*c* communicates with the tank 110 through the oil discharge portion 27*e*, inside-EPC-valve tank passages 113, 113*a*, PPC-valve tank passage 111 and tank port Ta. Therefore, a pressure of pressure oil output from the pressure oil output portion 27*d* is not increased.

In a case where a displacement of the spool 28 in a direction indicated by the arrow U exceeds a given amount, or where a current flowing through the solenoid coil 25 exceeds a given amount, the pressure oil input portion 27*b* communicates with the gap 27*c* through the notch 28*a*. As described above, pilot pressure oil enters the gap 27*c* and then it is output to the EPC-valve pressure oil input portion 30*b* of the shuttle valve 30.

Figure 11:
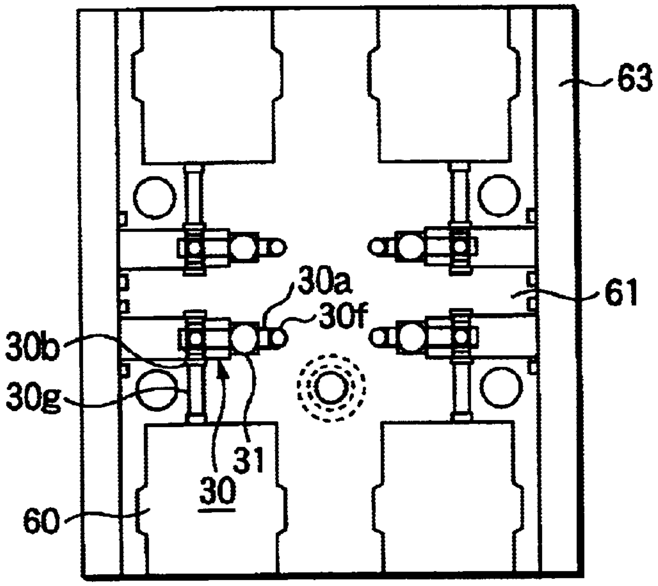
FIG. 11 is a sectional view taken along the line E—E of FIG. 4.
Figure 12:
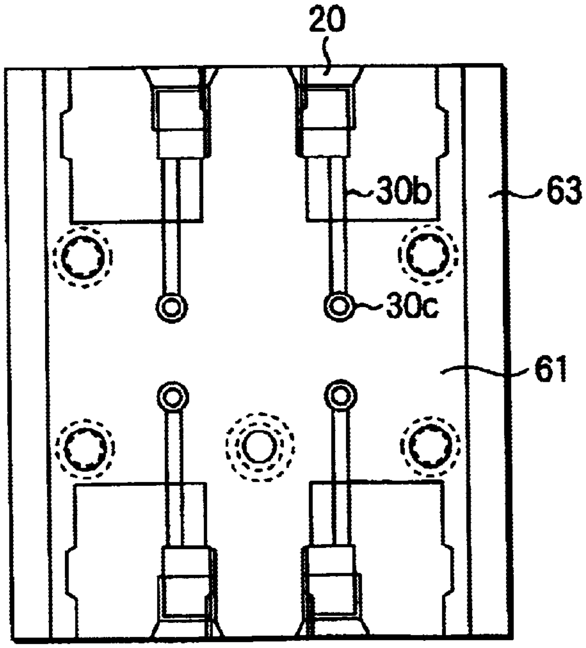
FIG. 12 is a sectional view taken along the line F—F of FIG. 4.

Next, the shuttle valve 30 is described in detail. Referring now to FIGS. 11 and 12, which show a sectional view taken along the line E—E of FIG. 4 and a sectional view taken along the line F—F of FIG. 4 respectively. It should be noted that FIGS. 11 and 12 represent a structure inside the EPC valve 60 for brevity. FIG. 11 is a sectional view of the shuttle valve 30, in which the shuttle valve 30 is provided in the EPC valve body 61. This shuttle valve 30 includes: a PPC-valve pressure oil input portion 30*a* connected to the PPC-valve pressure reducing valve 14; an EPC-valve pressure oil input portion 30*b* connected to the EPC-valve pressure reducing valve 27; and the shuttle-valve pressure oil output portion 30*c* for outputting a pressure of the piiot pressure oil from the shuttle valve 30 to the pilot line 19.

The PPC-valve pressure oil input portion 30*a* communicates with the PPC-valve pressure oil output chamber 15*f* of PPC-valve pressure reducing valve 14 through the PPC-valve pilot line 30*f*, as shown in FIGS. 5 and 8. Further, the EPC-valve pressure oil input portion 30*b* is connected to the pressure oil output portion 27*d* of the EPC-valve pressure reducing valve 27 through the EPC-valve pilot line 30*g*, as shown in FIGS. 1, 5 and 11.

The shuttle valve 30 has a ball 31 inserted between the PPC-valve pressure oil input portion 30*a* and the EPC-valve pressure oil input portion 30*b*. The ball 31 is provided so as to close the PPC-valve pressure oil input portion 30*a* and the EPC-valve pressure oil input portion 30*b* freely. In a case where the ball 31 closes the EPC-valve pressure oil input portion 30*b*, the PPC-valve pressure oil input portion 30*a* communicates with the shuttle-valve pressure oil output portion 30*c*. In contrast, in a case where the ball 31 closes the PPC-valve pressure oil input portion 30*a*, the EPC-valve pressure oil input portion 30*b* communicates with shuttle-valve pressure oil output portion 30*c*.

The shuttle-valve pressure oil output portion 30*c* communicates with the pilot line 19 through a shuttle-valve pilot passage 30*h*, as shown in FIG. 12.

The oil pressure signal output device 1 can be manipulated by the manipulation section 35 shown in FIG. 5 in addition to the operation lever 7. The manipulation section 35 shown in FIG. 5 is a wireless installation provided outside a driver's cab of a vehicle, which can send a control command by radio according to the manipulation of the manipulation section 35. With this control command, an amount of a current to be flowed in the solenoid coil 25 is instructed. The receiving section 36 receives a control command sent by the manipulation section 35. The control section 37 controls a current flowing through the solenoid coil 25 based on a control command received in the receiving section 36.

Next, the actuation of the oil pressure signal output device 1 is described. First, a case where an operator manipulates the oil pressure signal output device 1 using the operation lever 7 inside the driver's cab is described with reference to FIGS. 1–6, 9, 11 and 12.

FIGS. 1, 2 and 5 show a condition where the operation lever 7 stays in a neutral position. From this condition, swaying the operation lever 7 in the F direction causes the piston 6 to be pushed down through the disc plate 9 in a direction indicated by the arrow D. Then, the piston 6 displaces the spool 15 of the PPC-valve pressure reducing valve 14F through the second spring 13 in a direction indicated by the arrow D. In a case where a displacement of the spool 15 in a direction indicated by the arrow D is less than a given amount, or where a quantity of swaying of the operation lever 7 is less than a given amount, the notch 15*a* of the spool 15 does not communicate with the pressure oil input portion 14*b*, and the notch 15*a* communicates with the tank 110 through the oil discharge portion 14*c*, PPC-valve tank passage 111 and tank port Ta. Therefore, a pilot pressure of the PPC-valve pressure oil output chamber 15*f* is not increased.

On the other hand, in a case where a displacement of the spool 15 in a direction indicated by the arrow D exceeds a given amount, or where a quantity of swaying of the operation lever 7 exceeds a given amount, the pressure oil input portion 14*b* of the PPC-valve pressure reducing valve 14, which leads to the hydraulic pump 100, opens into the notch 15*a* of the spool 15, and pressure oil from the hydraulic pump 100 flows into the inner line 15*c* of the spool 15 depending on an overlapping area of the opening of the pressure oil input portion 14*b* and the notch 15*a*. Furthermore, the spool 15 receives a pressure of the pressure oil at the pressure receiving portion 15*d*, 15*e* to be displaced in a direction indicated by the arrow U shown in this drawing.

In association with this practice, an area of the opening portion where the pressure oil input portion 14*b* and the notch 15*a* overlap with each other is limited depending on a pressure of pilot oil. Thus, the pressure oil input to the PPC-valve pressure reducing valve 14F from the hydraulic pump 100 undergoes a reduction in pressure and then it is output to the pilot line 19 through the shuttle valve 30.

When swaying manipulation of the operation lever 7 becomes larger and thus the spool 15 is further pushed down, an opening area where the pressure oil input portion 14*b* and the notch 15*a* overlap with each other becomes larger and a pressure reduction amount of the pressure oil from the hydraulic pump 100 becomes smaller, and then a higher pressure of pilot pressure oil is supplied to the inner line 15*c*. The pilot pressure oil with a higher pressure that has entered the inner line 15*c* acts on the pressure receiving portions 15*d*, 15*e* of the spool 15 to cause the spool 15 to be displaced in a direction indicated by the arrow U shown in the drawing.

In this way, the spool 15 stops at a location where a pressure of pressure receiving portion 15*d*, 15*e* of the spool 15 and an urging force of the second spring 13 balance with each other, and a pressure of pilot pressure oil according to a quantity of swaying of the operation lever 7 is output to the PPC-valve pressure oil input portion 30*a* of the shuttle valve 30 through the PPC-valve pressure oil output chamber 15*f* and the pilot passage 30*f* inside the EPC valve.

As shown in FIG. 11, the pressure oil flowing into the PPC-valve pressure oil input portion 30*a* of the shuttle valve 30 moves the ball 31 leftward in the drawing (toward the left-side cover 63*a*) to close the EPC-valve pressure oil input portion 30*b*. This causes the PPC-valve pressure oil output chamber 15*f* of the PPC-valve pressure reducing valve 14F corresponding to the piston 6 to communicate with the pilot line 19 through the shuttle valve 30, shuttle-valve pressure oil output portion 30*c* and shuttle-valve pilot passage 30*h*, as shown in FIGS. 1 and 12.

Further, at this time, the pressure oil output portion 27*d* of the EPC-valve pressure reducing valve 27F is cut off because the EPC-valve pressure oil input portion 30*b* of the shuttle valve 30 is closed. As for the PPC-valve pressure reducing valves 14B, 14L and 14R except this one, while the pressure oil of the hydraulic pump 100 flows into them through the body 51, the pressure oil input portion 14*b* is cut off by the spool 15, thereby generating no pilot pressure oil.

In this manner, pilot pressure oil with a pressure depending on a quantity of swaying in the F direction of the operation lever 7 is output to the pilot line 19. Likewise, in a case where the operation lever 7 is manipulated in the other directions, B, L and R to cause the pistons 3, 4 and 5 to be displaced respectively, pilot pressure oils with pressures depending to quantities of swaying of the operation lever 7 in the respective directions are output to the pilot lines 16, 17 and 18 shown in FIGS. 5, 24A, and 24B.

Next, referring to FIGS. 1–6 and FIGS. 10–12, a case where construction machines including a hydraulic excavator are manipulated from outside a driver's cab is described. FIGS. 1, 2 and 5 show a case where no operator manipulates the machine and no current flows in the solenoid coil 25. It is assumed that an operator manipulates the manipulation section 35 from outside the driver's cab to send a control command by radio in this condition. The control command is received in the receiving section 36 and sent to the control section 37.

The control section 37 causes a current depending on an electrical quantity of the control command to flow in the solenoid coil 25 of the corresponding EPC valve 60. As a result of this, the solenoid coil 25 produces a thrust depending on a quantity of the current to displace the plunger 26 inwardly in the drawing (in the U direction in FIG. 10, which hereinafter refers to a direction toward the center of the EPC valve body 61), or toward the spool 28. The spool 28 hereby receives a thrust caused by the plunger 26 to be displaced inwardly When the spool 28 is displaced inwardly, the pressure oil input portion 27*b*, which leads to the hydraulic pump 100, communicates with the notch 28*a* of the spool 28, whereby pressure oil of the hydraulic pump 100 is supplied to the gap 27*c* through the notch 28*a*. The pilot pressure oil in the gap 27*c* acts on the annular portion 28*b* of the spool 28 to displace the spool 28 outwards in the drawing (in the D direction in FIG. 10, which hereinafter refers to a direction toward the plunger 26).

In association with this practice, an area of the opening portion where the pressure oil input portion 27*b* and the notch 28*a* of the spool 28 overlap with each other is limited depending on a pressure of pilot oil. Thus, the pressure oil input to the EPC-valve pressure reducing valve 27F from the hydraulic pump 100 undergoes a reduction in pressure and then it is output as pilot pressure oil through the gap 27*c* and the pressure oil output portion 27*d* and further output to the pilot line 19 through the shuttle valve 30. In this time, the spool 28 stops at a location where a thrust of the plunger 26 and a pressure of the pilot pressure oil for pressing the annular portion 28*b* of the spool 28 balance with each other.

Controlling a current flowing through the solenoid coil 25 to become larger: displaces the spool 28 more inwardly; makes larger an opening area where the pressure oil input portion 27*b* and the notch 28*a* of the spool 28 overlap with each other; makes a decreasing pressure of pressure oil from the hydraulic pump 100 smaller; and supplies the gap 27*c* with pilot pressure oil having a higher pressure. The high-pressure pilot pressure oil which has entered into the gap 27*c* acts on the annular portion 28*b* of the spool 28 to displace the spool 28 outwardly. The spool 28 stops at a location where a pressure of the pilot pressure oil and a thrust of the plunger 26 balance with each other.

Thus, pilot pressure oil having a pressure according to an amount of the current flowing through the solenoid coil 25 can be produced. The resulting pilot pressure oil is output to the EPC-valve pressure oil input portion 30*b* of the shuttle valve 30 through the pressure oil output portion 27*d* of the EPC valve 60F and the EPC-valve pilot line 30*g*.

As shown in FIG. 11, the pressure oil which has flowed into the EPC-valve pressure oil input portion 30*b* of the shuttle valve 30 moves the ball 31 rightward in the drawing (toward the center of the EPC valve body 61) to close the PPC-valve pressure oil input portion 30*a*. This causes the pressure oil output portion 27*d* of the EPC-valve pressure reducing valve 27F corresponding to the piston 6 to communicate with the pilot line 19 from the shuttle valve 30 through the shuttle-valve pressure oil output portion 30*c* and the shuttle-valve pilot passage 30*h*, as shown in FIGS. 1 and 12.

During this time, the pressure oil output portion 15*d* of the PPC-valve pressure reducing valve 14F is cut off because the PPC-valve pressure oil input portion 30*a* of the shuttle valve 30 is closed. While the pressure oil of the hydraulic pump 100 flows into the inside-EPC-valve pump passage 103 in the EPC valve body 61 through the body 51, the EPC-valve pressure reducing valve 27B, 27L and 27R except the valve 27F produce no pilot pressure oil because their pressure oil input portions 27*b* are cut off with the respective spools 28. The inside-EPC-valve tank passage 113 in the EPC valve body 61 serves to bring return oil back to the tank 110 through the inside-PPC-valve tank passage 103 of the body 51 because the EPC valve body 61 is cut off by the covers 63*a*, 63*b*.

Thus, pilot pressure oil having a pressure according to a control command sent from the manipulation section 35 by radio is output to the pilot line 19. This allows the manipulation of working vehicles from outside a driver s cab, which enables operators to manipulate such working machines from a remote location, even when a worksite is located in a dangerous place, such as a disaster-stricken district.

The first embodiment can provide the following advantages.

Hydraulic apparatuses including a PPC valve 50, EPC valves 60 and shuttle valves 30 are integrated. This makes it possible to reduce the occupied area of the hydraulic apparatuses, thereby to secure a larger space available for setting apparatuses or devices other than hydraulic apparatuses. More specifically, the EPC valve body 61 is disposed, in which the shuttle valves 30 are incorporated on the bottom surface of the PPC valve 50, and the EPC valves 60 are mounted on the opposed side surfaces thereof; the covers 63 for blocking the pump passage 103 and the tank passage 113 are attached removably on the other opposed side surfaces of the EPC valve body 61. For this reason, in the case of attaching an additional attachment, it is enough only to provide an EPC valve 60A for manipulating the additional attachment between the factory-supplied EPC valve body 61 and the covers 63. This allows an oil pressure signal output device capable of manipulating an additional attachment to be easily mounted without the need for adding a pump line and a tank line even after shipment.

When providing the EPC valves 60 on side surfaces of the EPC valve body 61 and a pilot line 19 for outputting pilot pressure oil on the side surface or the bottom surface St below the EPC valves 60, the EPC valves 60 are not subjected to the interference of the pilot line 19, so that the EPC valves can be easily mounted and removed and therefore the maintainability can be improved.

Figure 13:
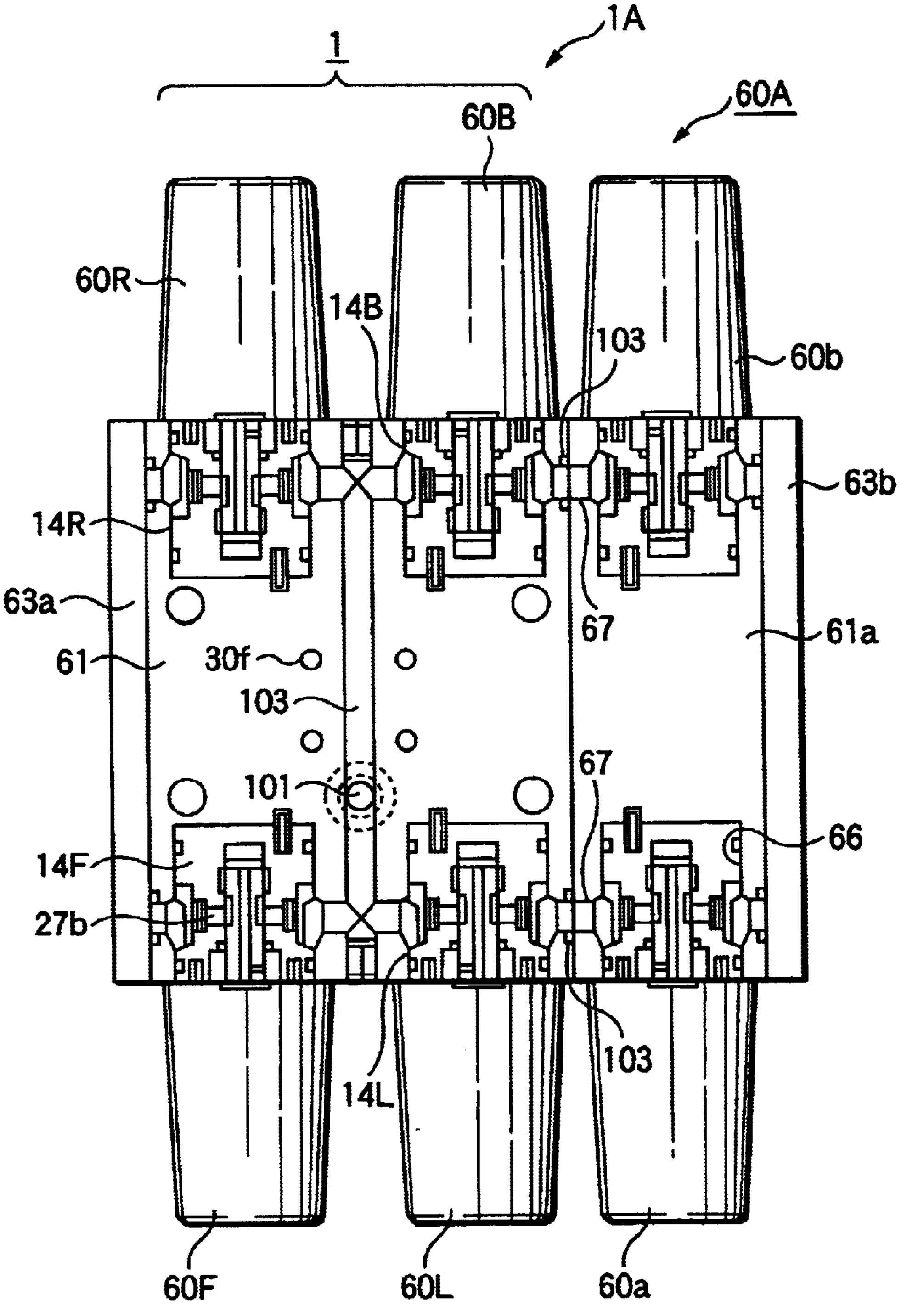
FIG. 13 is a plan sectional view of an EPC valve of an oil pressure signal output device of the second embodiment.
Figure 14:
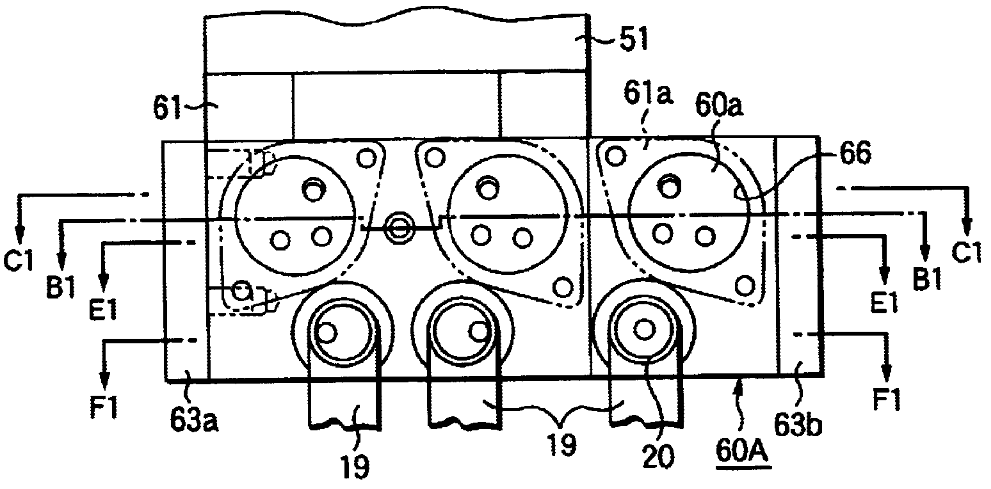
FIG. 14 is a partial front outline view of the EPC valve of FIG. 13.
Figure 15:
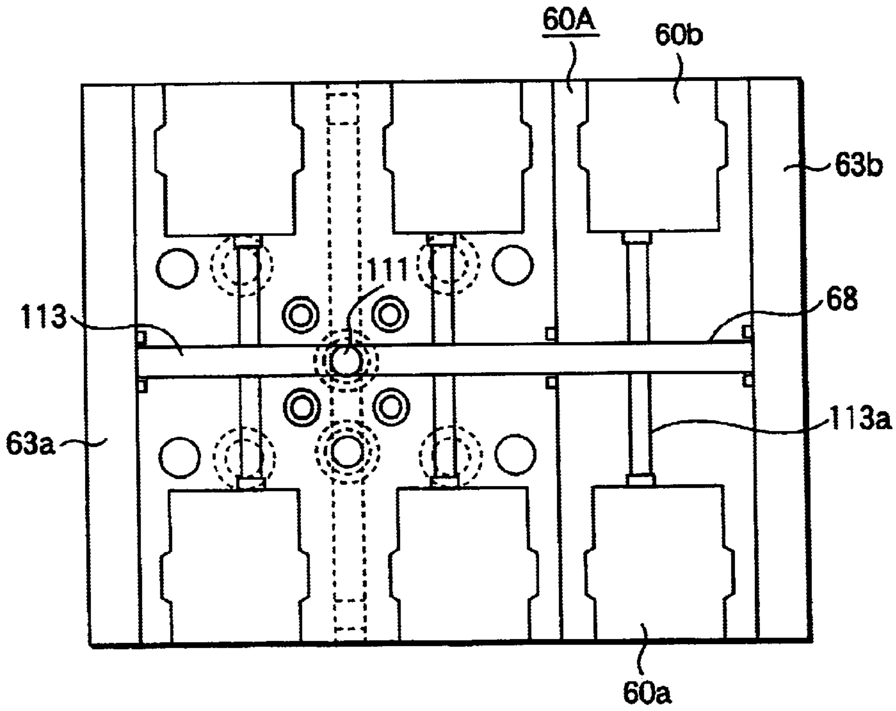
FIG. 15 is a sectional view taken along the line C1—C1 of FIG. 14.
Figure 16:
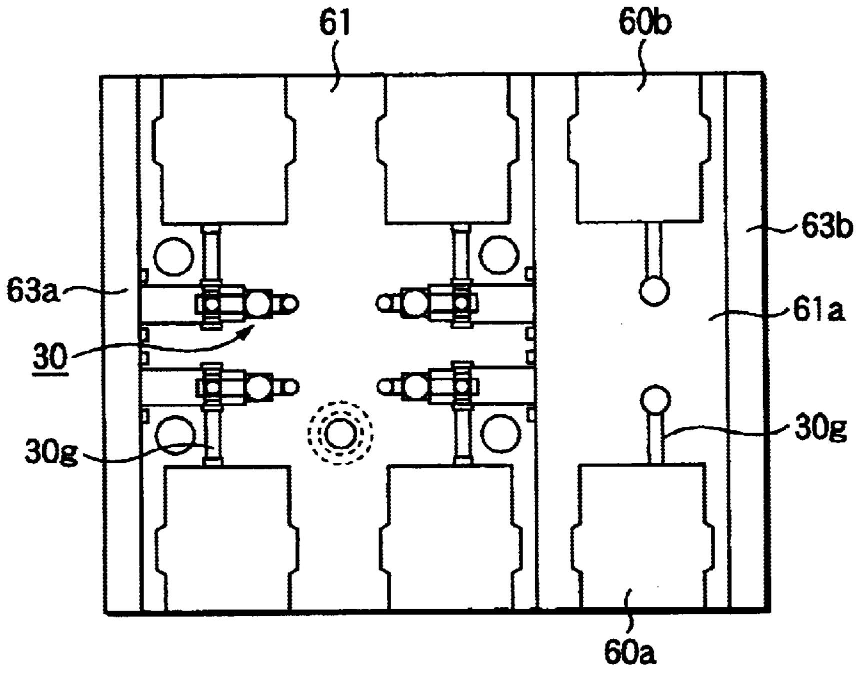
FIG. 16 is a sectional view taken along the line E1—E1 of FIG. 14.
Figure 17:
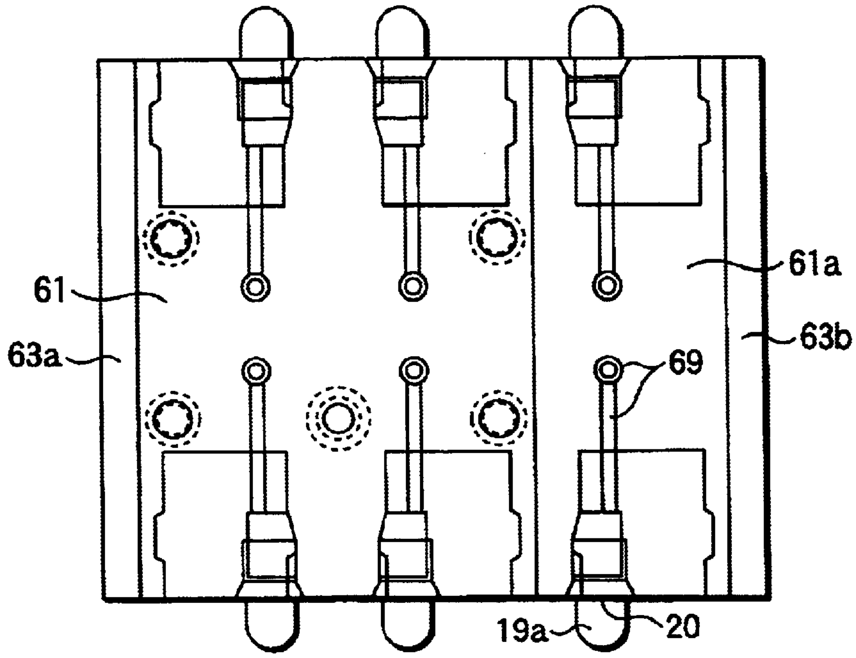
FIG. 17 is a sectional view taken along the line F1—F1 of FIG. 14.
Figure 18:
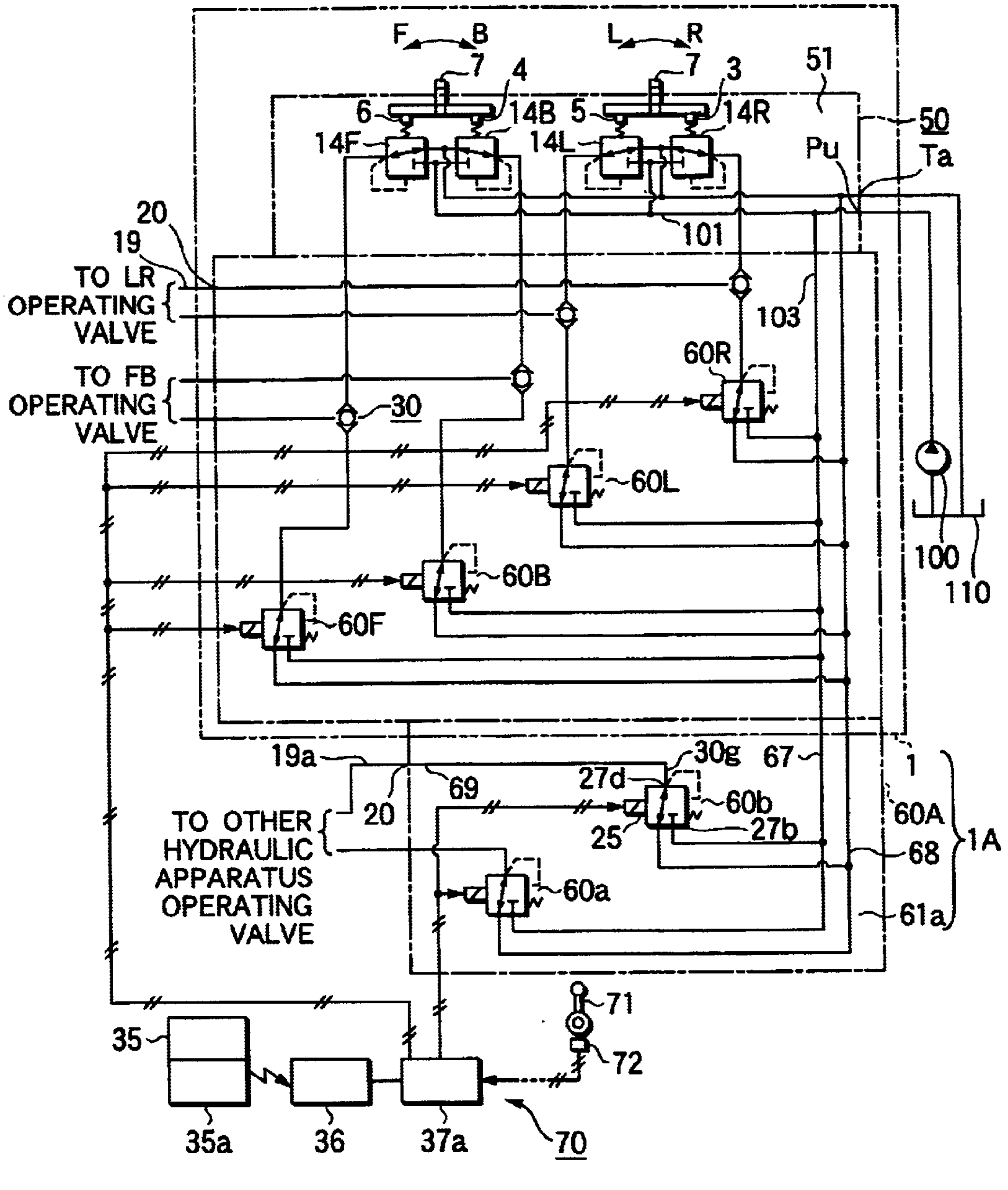
FIG. 18 is a hydraulic circuit diagram of the second embodiment.

Referring now to FIGS. 13–18, the first oil pressure signal output device 1A of the second embodiment is described. FIG. 13 is a plan sectional view of EPC valves of a first oil pressure signal output device 1A relating to this embodiment (a sectional view taken along the line B1—B1 of FIG. 14), which is equivalent to FIG. 6. FIG. 14 is a partial front outline view, which is equivalent to the side view taken from the direction indicated by the arrow Y of FIG. 2. FIG. 15 is a sectional view of the EPC valves (a sectional view taken along the line C1—C1 of FIG. 14), which is equivalent to FIG. 7. FIG. 16 is a sectional view of the EPC valves (a sectional view taken along the line E1—E1 of FIG. 14), which is equivalent to FIG. 11. FIG. 17 is a sectional view of the EPC valves (a sectional view taken along the line F1—F1 of FIG. 14), which is equivalent to FIG. 12. FIG. 18 is a hydraulic circuit diagram of the first oil pressure signal output device 1A. Now, it should be noted that FIGS. 15—17 represent the structure of the EPC valves 60 for brevity.

The first oil pressure signal output device 1A illustrated in FIGS. 13, 14 and 18 is a result of adding another EPC valve 60A for additionally manipulating another hydraulic apparatus to the oil pressure signal output device 1 of the first embodiment. More specifically, the first oil pressure signal output device 1A has another first EPC valve 60A attached to the right side surface of the EPC valve body 61 of the oil pressure signal output device 1 with the right-side cover 63*b* removed for a time and the right-side cover 63*b* is installed on the right side surface of this first EPC valve 60A.

The first EPC valve 60A includes a first EPC valve body 61*a*, and a pair of the EPC valves 60*a*, 60*b* mounted on the first EPC valve body 61*a*. The pair of EPC valves 60*a*, 60*b* are respectively installed in EPC-valve holes 66 formed on the opposed side surfaces of the first EPC valve body 61*a*, namely on the sides where the four EPC valves 60F, 60B, 60R and 60L in the EPC valve body 61 of the oil pressure signal output device 1 are mounted.

The pump passage 67, which leads to the inside-EPC-valve pump passage 103 of the EPC valve body 61, penetrates the first EPC valve body 61*a* and opens into the EPC-valve hole 66. The pump passage 67 is connected with the pressure oil input portion 27*b* of each of the EPC valves 60 to supply the EPC valves 60*a*, 60*b* with pressure oil of the hydraulic pump 100.

Referring to FIG. 15, in which a tank passage 68, which is connected to the inside-EPC-valve tank passage 113 of the EPC valve body 61, penetrates the first EPC valve body 61*a* to be formed therein. The tank passage 68 has one end portion shut off by the right-side cover 63*b*, a center portion connected with the inside-EPC-valve tank passages 113*a*, which are connected to the oil discharge portions 27*e* of the EPC valves 60*a*, 60*b*, and the other end connected to the inside-EPC-valve tank passage 113 of the adjacent EPC valve 60. The oil discharge portions 27*e* of the EPC valves 60*a*, 60*b* are connected through the inside-EPC-valve tank passage 113*a*, 68 and 113, and the inside-PPC-valve tank passage 111 to the tank 110 to bring return oils of the EPC valves 60*a*, 60*b* back to the tank 110.

The pump passage 67 and tank passage 68, which penetrate the first EPC valve body 61*a*, communicate with the inside-EPC-valve pump passage 103 and the inside-EPC-valve tank passage 113 in the adjacent EPC valve 60 respectively, and are covered by the right-side cover 63*b* at their right-side end surface of the first EPC valve body 61*a* to prevent pressure oil or return oil from leaking outside.

Referring to FIGS. 16 and 17, in which the first EPC valve body 61*a* is provided with pilot passages 69 for directing pilot pressure oils output from the EPC valves 60*a*, 60*b* to the respective pilot discharge openings 20. These pilot passages 69 each have one end portion connected to the pressure oil output portion 27*d* of the EPC-valve pressure reducing valve 27 through the EPC-valve pilot line 30*g*, and the other end connected to the pilot discharge opening 20.

To the pilot discharge openings 20, the pilot lines 19*a* are each installed. The pilot lines 19*a* supply the respective pilot pressure oils output from the EPC valves 60*a*, 60*b* to an operating valve for an attachment (not shown).

In FIG. 18, the first oil pressure signal output device 1A is provided with a manipulation section 70 for additionally manipulating another EPC valve 60A in addition to the operation lever 7 and the manipulation section 35, which are used for manipulating the oil pressure signal output device 1 shown in the first embodiment. The manipulation section 70 includes an electric operation lever 71 for manipulating the EPC valve 60A from inside a driver's cab and a first manipulation section 35*a* for manipulating the EPC valve 60A from outside the driver's cab.

As for the operation lever 7 and the manipulation section 35, which are for manipulating the oil pressure signal output device 1 from inside and outside the driver's cab respectively, their descriptions are omitted because they are the same as those of the first embodiment. The first manipulation section 35*a* of the wireless installation is provided with an operating switch (not shown). When manipulating this operating switch, the first manipulation section 35*a* sends a control command by radio according to a quantity of the operation, like the manipulation section 35. The receiving section 36 receives the control command sent by the first manipulation section 35*a* and send it to the first control section 37*a*. The first control section 37*a* controls a command current in the solenoid coil 25 of the corresponding EPC valve 60 based on the control command received in the receiving section 36.

Inside the driver's cab, there are provided with the operation lever 7 and the electric operation lever 71 for the manipulating the EPC valve 60A. In the electric operation lever 71, a stroke sensor 72 for detecting the operation direction thereof and a quantity of the operation is attached. The stroke sensor 72 sends signals for the detected operation direction and the detected amount of stroke to the first control section 37*a*.

The first control section 37*a* monitors a control command of the EPC valve 60A based on signals of the operation direction of the electric operation lever 71 and an amount of stroke thereof, and a control command of the operating switch of the first manipulation section 35*a* to output a command current according to the higher control command to solenoid coils 25 of the EPC valves 60*a*, 60*b*. Based on this command current, each of the solenoid coils 25 controls the EPC valves 60*a*, 60*b*, as in the case of the EPC valves 60 of the first embodiment, and it outputs pilot pressure oil having a pressure in response to the command current to the pilot line 19.

The pilot line 19 supplies the operating valve for an attachment (not shown), which is the additional hydraulic apparatus, with pilot pressure oils output from the EPC valves 60*a*, 60*b* differently.

Next, the actuation of the first oil pressure signal output device 1A is described.

The description about a case where an operator manipulates the operation lever 7 inside the driver's cab or manipulates the device through the manipulation section 35 outside the driver's cab is omitted, because they are the same as in the case of the oil pressure signal output device 1 of the first embodiment. The respective cases where an operator manipulates the electric operation lever 71 inside the driver's cab and he or she manipulates the first manipulation section 35*a* outside the driver's cab are described here. For example, the electric operation lever 71 or first manipulation section 35*a* is manipulated to actuate the EPC valve 60*a* or 60*b*, and to supply pilot pressure oil to the operating valve for an attachment (not shown), which is an additional hydraulic apparatus, thereby manipulating the additional attachment, such as a clamshell.

In FIG. 18, when an operator manipulates the electric operation lever 71 inside a driver's cab, the stroke sensor 72 detects the operation direction and a quantity of the operation to send this detected signals to the first control section 37*a*. The first control section 37*a* outputs command currents according to the operation direction and an amount of stroke to the solenoid coil 25 of the corresponding EPC valve 60*a* or 60*b* to control the EPC valves 60*a*, 60*b* through the solenoid coils 25 by the same action as in the case of the EPC valves 60 of the first embodiment and to output pilot pressure oil having a pressure according to the command current to the pilot line 19. This pilot pressure oil controls the operating valve for the attachment according to the operation direction and an amount of stroke of the electric operation lever 71 to actuate the attachment at a rate according to the amount of stroke.

Now, a case of manipulating the first manipulation section 35*a* outside a driver's cab is described. When manipulating the operating switch of the first manipulation section 35*a*, control commands are sent by radio according to the operation direction and a quantity of the operation and sent to the first control section 37*a* through the receiving section 36.

The first control section 37*a* outputs a command current according to the size of the control command to the solenoid coil 25 of the corresponding EPC valve 60*a* or 60*b*, causes the solenoid coil 25 to produce a thrust according to an amount of the command current, controls the EPC valves 60*a*, 60*b* in the same manner as in the case of the electric operation lever 71 inside a driver's cab, and actuates the attachment according to the operation direction at a rate according to a quantity of the operation of the operating switch.

Figure 19:
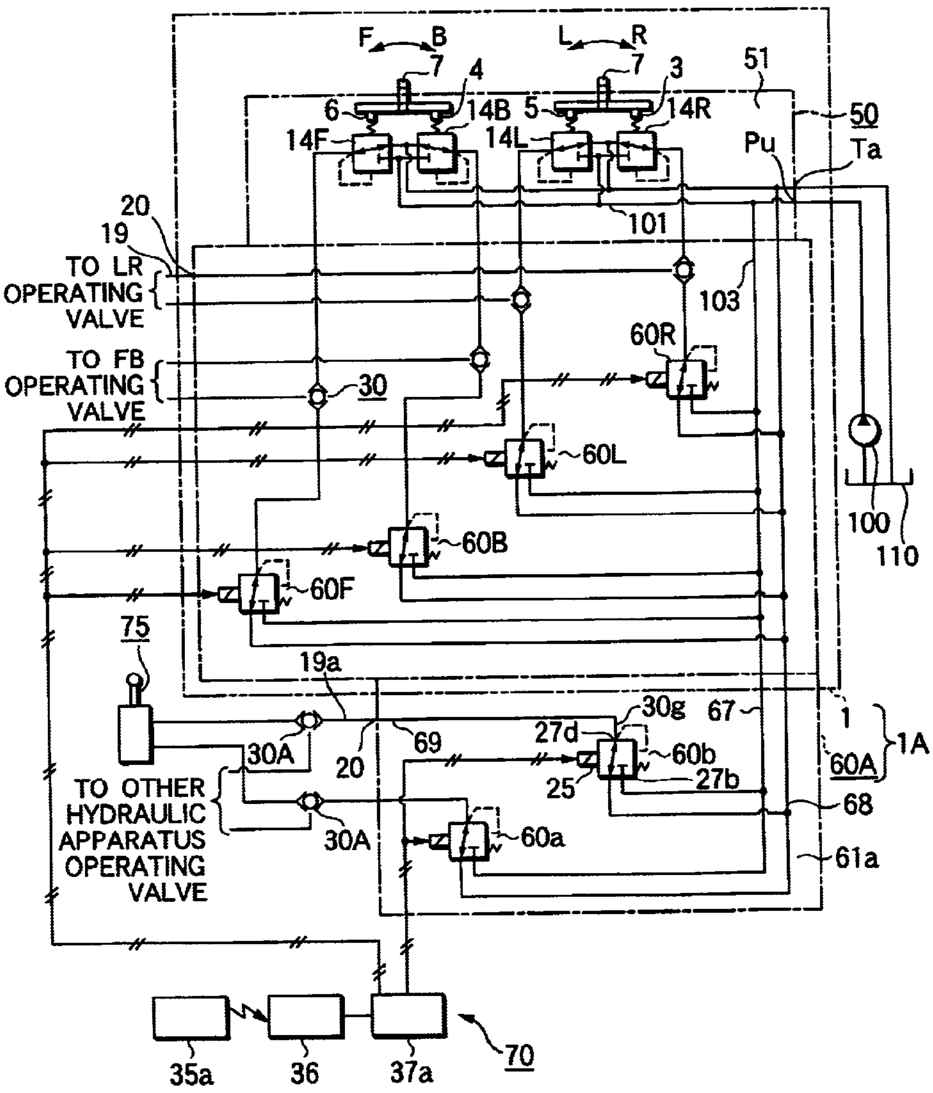
FIG. 19 is a hydraulic circuit diagram of another embodiment.

In the second embodiment, an example in which the electric operation lever 71 is used for the manipulation inside a driver's cab as a manipulation section 70 of an additional EPC valve 60A (EPC valves 60*a*, 60*b* in the drawing) have been described. However, in another embodiment, a first PPC valve 75 similar to the PPC valve 50 in the first embodiment may be used instead of the electric operation lever 71, as shown in FIG. 19. In this case, the first PPC valve 75 is disposed inside a driver's cab and the first manipulation section 35*a* of a wireless installation is disposed outside the driver's cab as in the case of the second embodiment.

Referring to FIG. 19, when manipulating an additional EPC valve 60A inside a driver's cab, the first PPC valve 75 is manipulated, thereby causing the PPC-valve pressure reducing valve (not shown) to produce pilot pressure oil and to output the pilot pressure oil through the first shuttle valve 30A to the operating valve for the attachment. Likewise, in a case of manipulating an additional EPC valve 60A outside a driver's cab, the operating switch provided in the first manipulation section 35*a* is manipulated, thereby causing the corresponding EPC valves 60*a*, 60*b* to produce pilot pressure oil having a pressure according to a quantity of the operation and to output the pilot pressure oil through the first shuttle valve 30A to the operating valve for the attachment.

In the second embodiment, while the manipulation section 35, first manipulation section 35*a* and electric operation lever 71 are each arranged to output a control command according to a quantity of the operation, a switch for ON-OFF switching may be used. Also, in this case, the EPC valve 60 may be an electromagnetic valve for ON-OFF operation.

The second embodiment can be provide the following advantages.

Like the first embodiment, the hydraulic apparatuses are integrated to constitute the first oil pressure signal output device 1A, so that it becomes possible to reduce the occupied area by the hydraulic apparatuses, thereby to secure a larger space available for apparatuses or devices other than the hydraulic apparatuses.

Further, the first oil pressure signal output device 1A is provided with a hydraulic pump passage and a tank passage, which communicate with each other, between a set of EPC valves 60 for hydraulic apparatuses as standard equipment and the adjacent EPC valve 60A for an additional hydraulic apparatus. For this reason, in additionally installing an attachment, it is not required to provide a pump line, tank line and the like, which are used for the installation of the additional hydraulic apparatus, and therefore space-saving additional installation can be realized. This makes it possible to mount an oil pressure signal output device capable of manipulating an additional attachment easily and compactly, and to improve the ease of construction and maintainability, even at the time of and after the shipment of working vehicles.

Figure 20:
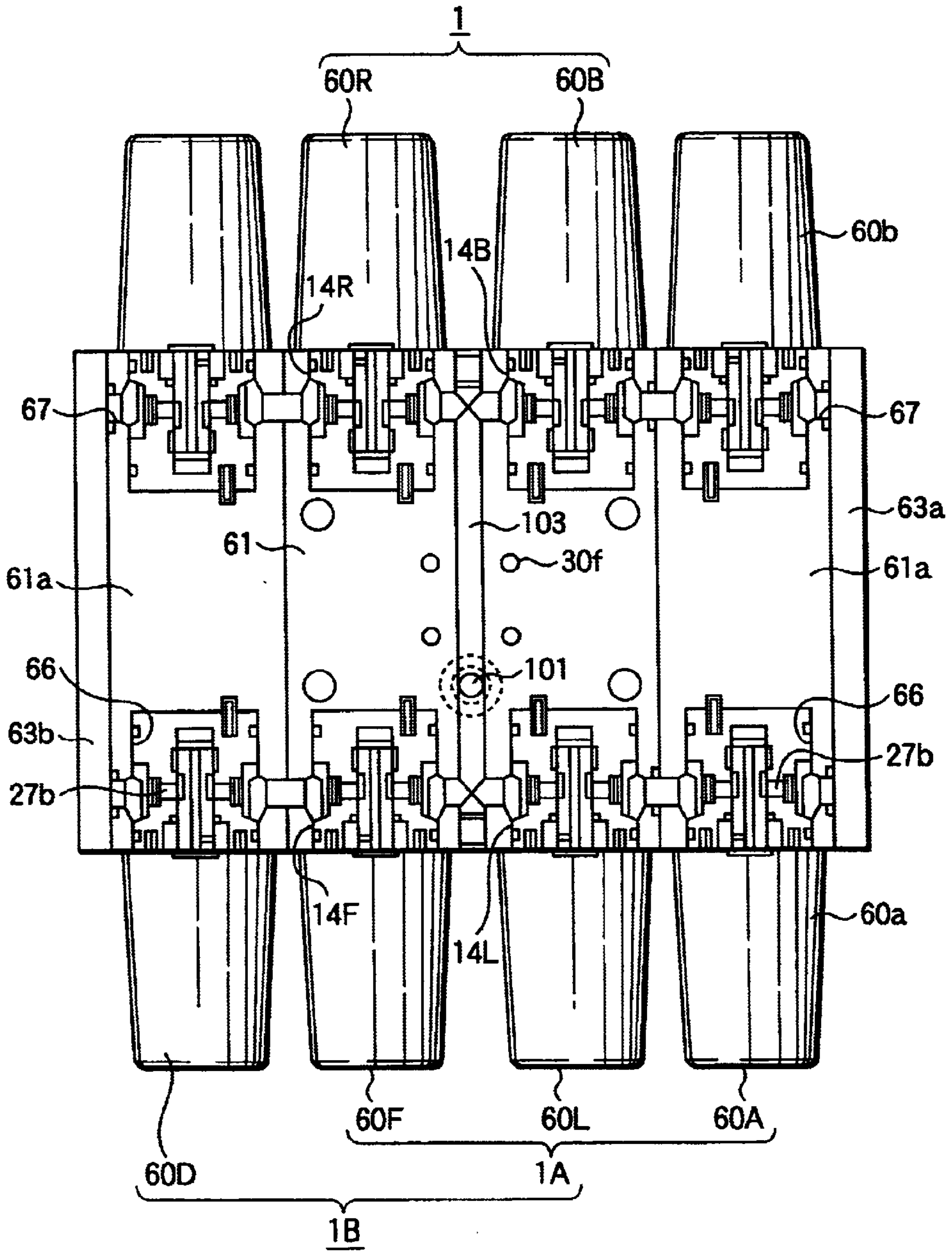
FIG. 20 is a plan sectional view of an EPC valve of the third embodiment.
Figure 21:
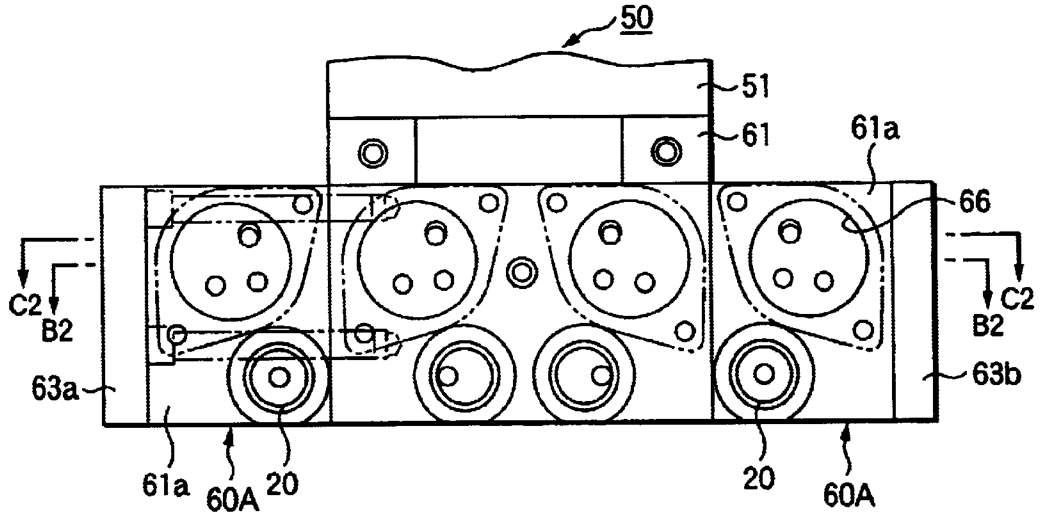
FIG. 21 is a partial front outline view of an EPC valve of the third embodiment.
Figure 22:
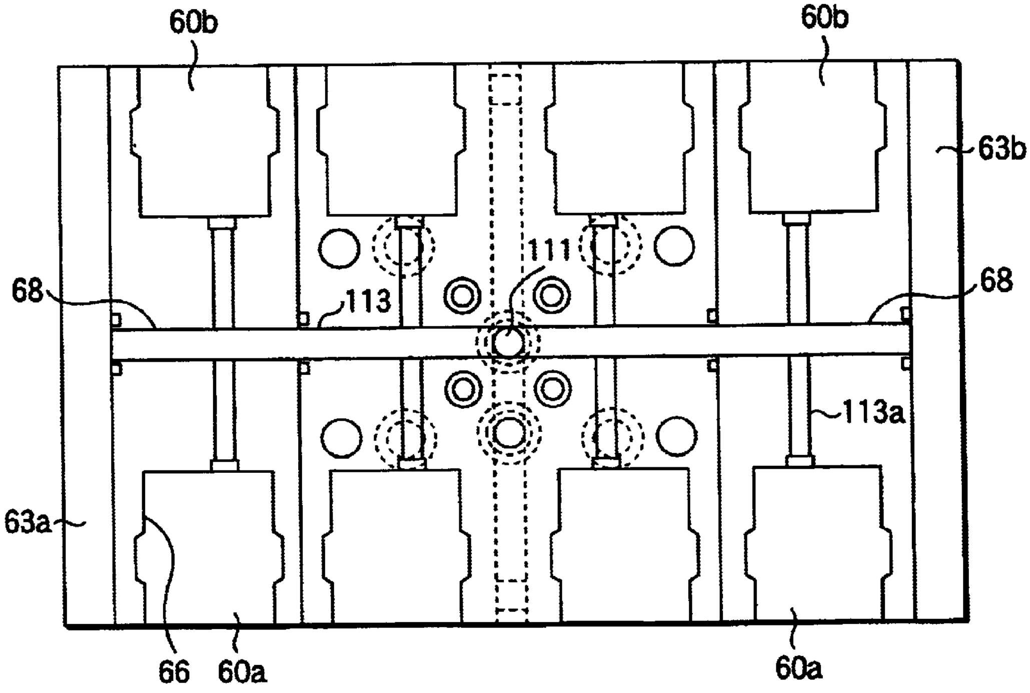
FIG. 22 is a sectional view taken along the line C2—C2 of FIG. 21.

Referring now to FIGS. 20–22, a second oil pressure signal output device 1B of the third embodiment is described. FIG. 20 is a sectional view of the EPC valves (a sectional view taken along the line B2—B2 of FIG. 21), which is equivalent to FIG. 6. FIG. 21 is a partial front outline view, which is equivalent to a side view taken from the direction indicated by the arrow Y of FIG. 2. FIG. 22 is a sectional view of the EPC valves (a sectional view taken along the line C2—C2 of FIG. 21), which is equivalent to FIG. 7. Now, it should be noted that FIG. 22 represents the structure inside the EPC valves 60 for brevity.

The second oil pressure signal output device 1B shown in FIGS. 20, 21 and 22 is a result of adding an additional second EPC valve 60D for manipulating another additional hydraulic apparatus to the first oil pressure signal output device 1A described in the second embodiment. More specifically, in the second oil pressure signal output device 1B of the embodiment, there are attached: an additional first EPC valve 60A to the side surface of the EPC valve body 61 in the oil pressure signal output device 1 of the first embodiment on the right of the drawing; an additional second EPC valve 60D to the side surface of the EPC valve body 61 on the left of the drawing; a right-side cover 63*b* to the right side surface of the first EPC valve 60A; and a left-side cover 63*a* to the left side surface of the second EPC valve 60D. The second EPC valve 60D is arranged to be the same as the first EPC valve 60A and to actuate in the same way. This makes it possible to additionally mount two operating valves for activating additional hydraulic apparatuses to the first embodiment.

In the case of the above second oil pressure signal output device 1B, the additional first EPC valves 60A for manipulating new additional hydraulic apparatuses are added on both side surfaces of the oil pressure signal output device 1 in the first embodiment, one for each additional hydraulic apparatus. However, it is not necessary to be so limited, and a plurality of such additional first EPC valves 60A may be provided on at least one side surface. The added first EPC valve 60A can be controlled by a manipulation section similar to that of the second embodiment (the manipulation section 70 inside/outside a driver's cab).

Also, in this case, the first EPC valves 60A for an additional apparatuses to be provided on both the side surfaces of the standard-equipment EPC valves 60 are provided with an oil pressure pump passage and a tank passage, which communicate with each other, between the adjacent EPC valve 60 and the first EPC valves, so that it is not required to a pump line, a tank line and the like for the first EPC valve 60A used for the additional apparatus. This makes it possible to easily and compactly mount an oil pressure signal output device capable of manipulating a new attachment even at the time of and after the shipment in the same way, thereby improving the ease of construction or maintainability and securing a larger space available for setting apparatuses or devices other than the hydraulic apparatuses.

Figure 23A:
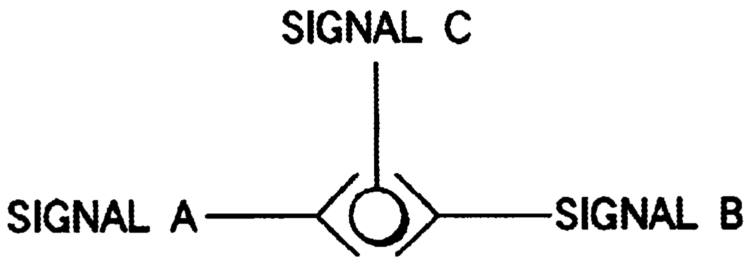
FIGS. 23A and 23B are block diagrams of a selecting output means.
Figure 23B:
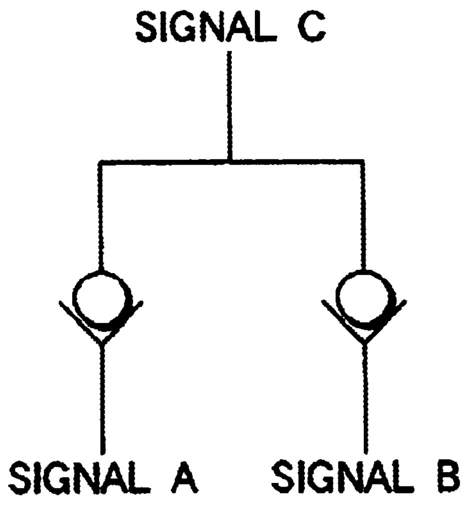

While an example where a shuttle valve (See FIG. 23A) is used as a selecting output means is shown in the above-described embodiments, it is not necessary to be so limited and the device may be constituted by a combination of a plurality of check valves, for example, as shown in FIG. 23B.

As described above, the invention can provide the following advantages.

The oil pressure signal output device has a PPC valve and EPC valves integrated, and a pump passage and tank passage, which communicate with each other, provided on the side surface of the EPC valve body. When providing an additional EPC valve; an additional EPC valve can be mounted on the EPC valve body side surface, a pump passage and a tank passage of the additional EPC valve communicate with a pump passage and a tank passage of the EPC valve body side surface respectively, so that no additional piping is required. Therefore, it is possible to reduce a space for the hydraulic apparatuses, to facilitate the piping work and to improve the ease of construction. Further, it is possible to provide an oil pressure signal output device capable of accommodating the addition of a new attachment easily even after shipment of vehicles.

What is claimed is:

1. An oil pressure signal output device comprising:

a manual oil pressure signal output device for outputting an oil pressure signal based on a manual operation;

at least one first electric oil pressure signal output device for outputting an oil pressure signal based on an electric signal; and selecting output means for selecting either an oil pressure signal output from said manual oil pressure signal output device or an oil pressure signal output from said first electric oil pressure signal output device to output the selected oil pressure signal outside;

wherein said manual oil pressure signal output device for controlling a first hydraulic apparatus, said first electric oil pressure signal output device and said selecting output means are integrated, a second electric oil pressure signal output device for controlling a second hydraulic apparatus different from the first hydraulic apparatus is removably provided and abutting against said first electric oil pressure signal output device.

2. The oil pressure signal output device of claim 1, wherein a bottom surface of said manual oil pressure signal output device and an upper surface of said first electric oil pressure signal output device abut against each other to be integrated, and said second electric oil pressure signal output device is removably provided on a side surface of said first electric oil pressure signal output device.

3. The oil pressure signal output device of claim 1, wherein said manual oil pressure signal output device, said first electric oil pressure signal output device, and said second electric oil pressure signal output device, which are mutually adjacent, are connected through pump passages and tank passages provided inside said oil pressure signal output devices and are connected to a common hydraulic pump and a common tank.

4. The oil pressure signal output device of claim 2, wherein said manual oil pressure signal output device, said first electric oil pressure signal output device, and said second electric oil pressure signal output device, which are mutually adjacent, are connected through pump passages and tank passages provided inside said oil pressure signal output devices and are connected to a common hydraulic pump and a common tank.

5. An oil pressure signal output device comprising:

a manual oil pressure signal output device for outputting an oil pressure signal based on a manual operation by an operator in a driver's cab;

at least one first electric oil pressure signal output device for outputting an oil pressure signal based on an electric signal from outside the driver's cab; and selecting output means for selecting either an oil pressure signal output from said manual oil pressure signal output device or an oil pressure signal output from said first electric oil pressure signal output device to output the selected oil pressure signal outside, wherein said manual oil pressure signal output device for controlling a first hydraulic apparatus, said first electric oil pressure signal output device and said selecting output means are integrated, a pump passage for supplying pressure oil from a hydraulic pump, and a tank passage for draining return oil into a tank, which are respectively brought into communication with a side surface of said first electric oil pressure signal output device, a second electric oil pressure signal output device for controlling a second hydraulic apparatus different from the first hydraulic apparatus can be mounted additionally, and covers for blocking said pump passage and said tank passage are removably provided on side surfaces of said first electric oil pressure signal output device.

6. The oil pressure signal output device of claim 5, wherein a bottom surface of said manual oil pressure signal output device and an upper surface of said first electric oil pressure signal output device abut against each other to be integrated, and said second electric oil pressure signal output device is removably provided on a side surface of said first electric oil pressure signal output device.

7. The oil pressure signal output device of claim 5, wherein said manual oil pressure signal output device, said first electric oil pressure signal output device, and said second electric oil pressure signal output device, which are mutually adjacent, are connected through pump passages and tank passages provided inside said oil pressure signal output devices and are connected to a common hydraulic pump and a common tank.

8. The oil pressure signal output device of claim 6, wherein said manual oil pressure signal output device, said first electric oil pressure signal output device, and said second electric oil pressure signal output device, which are mutually adjacent, are connected through pump passages and tank passages provided inside said oil pressure signal output devices and are connected to a common hydraulic pump and a common tank.

* * * * *